US012271148B2

(12) United States Patent
Kishi et al.

(10) Patent No.: US 12,271,148 B2
(45) Date of Patent: *Apr. 8, 2025

(54) DRUM UNIT HAVING ELECTRICAL CONTACT SURFACE POSITIONED AT OUTER SURFACE OF FRAME AND IMAGE FORMING APPARATUS PROVIDED WITH THE SAME

(71) Applicant: BROTHER KOGYO KABUSHIKI KAISHA, Nagoya (JP)

(72) Inventors: Isao Kishi, Nagoya (JP); Nao Itabashi, Nagoya (JP); Yohei Hashimoto, Nagakute (JP); Kouji Watanabe, Gifu (JP); Makoto Souda, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,200

(22) Filed: Oct. 31, 2023

(65) Prior Publication Data

US 2024/0061372 A1 Feb. 22, 2024

Related U.S. Application Data

(63) Continuation of application No. 17/674,416, filed on Feb. 17, 2022, now Pat. No. 11,853,002, which is a (Continued)

(30) Foreign Application Priority Data

Aug. 1, 2017 (JP) ................................ 2017-149328

(51) Int. Cl.
*G03G 21/18* (2006.01)
*G03G 21/16* (2006.01)

(52) U.S. Cl.
CPC ..... *G03G 21/1857* (2013.01); *G03G 21/1623* (2013.01); *G03G 21/1647* (2013.01);
(Continued)

(58) Field of Classification Search
CPC ........... G03G 21/1623; G03G 21/1647; G03G 21/1671; G03G 21/1857; G03G 21/1821;
(Continued)

(56) References Cited

U.S. PATENT DOCUMENTS 5,926,666 A 7/1999 Miura et al.
10,401,789 B2 9/2019 Kishi et al.
(Continued)

FOREIGN PATENT DOCUMENTS

CN 101109918 A 1/2008
CN 102193373 A 9/2011
(Continued)

OTHER PUBLICATIONS

International Search Report and Written Opinion issued in related International Patent Application No. PCT/JP2018/013601, May 1, 2018.

(Continued)

*Primary Examiner* — Carla J Therrien
(74) *Attorney, Agent, or Firm* — Merchant & Gould P.C.

(57) ABSTRACT

A drum unit includes: a frame; a first photosensitive drum; a second photosensitive drum; a charger; and a storage medium. The frame includes: a first frame plate; a second frame plate spaced apart from the first frame plate in a first direction; a third frame plate connecting one end of the first frame plate to one end of the second frame plate; and a fourth frame plate connecting another end of the first frame plate to another end of the second frame plate. The first photosensitive drum and the second photosensitive drum are rotatably supported by the frame. The second photosensitive
(Continued)

drum is spaced apart from the first photosensitive drum and positioned closer to the third frame plate than the first photosensitive drum to the third frame plate in a second direction. The storage medium has an electrical contact surface positioned at an outer surface of the third frame plate.

19 Claims, 19 Drawing Sheets

Related U.S. Application Data continuation of application No. 16/951,096, filed on Nov. 18, 2020, now Pat. No. 11,262,695, which is a continuation of application No. 16/539,631, filed on Aug. 13, 2019, now Pat. No. 10,845,755, which is a continuation of application No. 15/941,275, filed on Mar. 30, 2018, now Pat. No. 10,401,789.

(52) U.S. Cl.
CPC ..... *G03G 21/1671* (2013.01); *G03G 21/1821* (2013.01); *G03G 21/1853* (2013.01); *G03G 21/1871* (2013.01); *G03G 2221/1684* (2013.01)

(58) Field of Classification Search
CPC ........... G03G 21/1853; G03G 21/1871; G03G 21/1878; G03G 21/1882; G03G 21/1885; G03G 2221/1684
See application file for complete search history.

(56) References Cited

U.S. PATENT DOCUMENTS 10,845,755 B2 11/2020 Kishi et al.
11,262,695 B2 3/2022 Kishi et al.
11,853,002 B2* 12/2023 Kishi ................. G03G 21/1857
2003/0215261 A1 11/2003 Karakama et al.
2004/0022556 A1 2/2004 Nomura
2005/0078978 A1 4/2005 Suzuki et al.
2006/0024080 A1 2/2006 Chadani et al.
2007/0122166 A1* 5/2007 Takahashi .......... G03G 21/1889 399/24
2008/0019729 A1 1/2008 Hoshio et al.
2008/0124094 A1 5/2008 Eom
2008/0159772 A1 7/2008 Koishi et al.
2008/0159775 A1 7/2008 Koishi et al.
2009/0214277 A1 8/2009 Jeon et al.
2009/0269100 A1 10/2009 Hashimoto
2010/0135689 A1 6/2010 Abe et al.
2010/0135693 A1 6/2010 Okabe et al.
2010/0247195 A1 9/2010 Ishino et al.
2010/0329757 A1 12/2010 Souda
2011/0075213 A1 3/2011 Murayama
2011/0075214 A1 3/2011 Murayama
2011/0229194 A1 9/2011 Okabe et al.
2011/0229197 A1 9/2011 Tada et al.
2013/0223869 A1 8/2013 Oda
2014/0169828 A1* 6/2014 Ohta .................. G03G 21/1695 399/110
2014/0348521 A1 11/2014 Mase et al.
2015/0037066 A1 2/2015 Tokuda
2015/0261181 A1 9/2015 Moon et al.
2015/0277360 A1 10/2015 Abe et al.
2016/0258490 A1 9/2016 Sasaki et al.
2016/0291521 A1 10/2016 Nagata
2016/0349699 A1 12/2016 Miyamoto et al.
2017/0023902 A1 1/2017 Uchida
2017/0075294 A1 3/2017 Payne et al.
2017/0185032 A1 6/2017 Itabashi et al.
2017/0248910 A1 8/2017 Hayakawa
2017/0269544 A1* 9/2017 Itabashi ............. G03G 21/1676
2019/0196394 A1 6/2019 Yakubi et al.

FOREIGN PATENT DOCUMENTS

CN 102193474 A 9/2011
CN 104137003 A 11/2014
CN 104950617 A 9/2015
JP 2003-241462 A 8/2003
JP 2003-280321 A 10/2003
JP 2003-280491 A 10/2003
JP 2004-126017 A 4/2004
JP 2007-47397 A 2/2007
JP 2008-165023 A 7/2008
JP 2009-265390 A 11/2009
JP 2010-128336 A 6/2010
JP 2010-128337 A 6/2010
JP 2010-175619 A 8/2010
JP 2010-231108 A 10/2010
JP 2011-13268 A 1/2011
JP 2011-075644 A 4/2011
JP 2011-075650 A 4/2011
JP 2011-75747 A 4/2011
JP 2015-145906 A 8/2015
JP 2015-172638 A 10/2015
JP 2015-194534 A 11/2015
JP 2017-116828 A 6/2017

OTHER PUBLICATIONS

Machine translation of JP2010-175619. Aug. 12, 2010. (Year: 2010).
International Preliminary Report on Patentability issued in corresponding International Patent Application No. PCT/JP2018/013601, Feb. 13, 2020.
Extended European Search Report issued in corresponding European Patent Application No. 18840728.2, Feb. 16, 2021.
Office Action issued in corresponding Japanese Patent Application No. 2017-149328, Jun. 8, 2021.
Office Action (Notice of Reasons for Refusal) issued in corresponding Japanese Patent Application No. 2017-149328, Oct. 19, 2021.
Office Action issued in corresponding Chinese Patent Application No. 201880044400.9, Nov. 25, 2021.
Office Action issued in corresponding Chinese Patent Application No. 201880044400.9, Jul. 21, 2022.
Office Action issued in corresponding Chinese Patent Application No. 201880044400.9, Oct. 24, 2022.

* cited by examiner

DRUM UNIT HAVING ELECTRICAL CONTACT SURFACE POSITIONED AT OUTER SURFACE OF FRAME AND IMAGE FORMING APPARATUS PROVIDED WITH THE SAME

CROSS REFERENCE TO RELATED APPLICATION

This application is a continuation of U.S. application Ser. No. 17/674,416, filed Feb. 17, 2022, which is a continuation of U.S. application Ser. No. 16/951,096, filed Nov. 18, 2020, now U.S. Pat. No. 11,262,695, which is a continuation of U.S. application Ser. No. 16/539,631, filed Aug. 13, 2019, now U.S. Pat. No. 10,845,755, which is a continuation of U.S. application Ser. No. 15/941,275 filed Mar. 30, 2018, now U.S. Pat. No. 10,401,489, which claims priority from Japanese Patent Application No. 2017-149328 filed Aug. 1, 2017. The entire content of the priority applications is incorporated herein by reference. The present application is closely related to U.S. patent application Ser. No. 15/941,182 filed Mar. 30, 2018.

TECHNICAL FIELD

The present disclosure relates to a drum unit, and an image forming apparatus provided with the same.

BACKGROUND

Conventionally, an electro-photographic type image forming apparatus such as a laser printer and an LED printer is known in the art. The image forming apparatus includes a drum unit. The drum unit includes a plurality of photosensitive drums. A plurality of developing cartridges is detachably attachable to the drum unit. When a developing cartridge is attached to the drum unit, a developing roller provided in the developing cartridge contacts a corresponding photosensitive drum provided in the drum unit.

Japanese Patent Application Publication No. 2010-128336 discloses such an image forming apparatus including a drum unit.

SUMMARY

A developing cartridge including a storage medium is also well known in the art. The storage medium stores various information relating to the developing cartridge. In recent years, a large amount of information is handled not only for the developing cartridges, but also for drum units. Consequently, it is demanded that a storage medium is mounted on a drum unit. When a storage medium is mounted on a drum unit, an electrical contact surface of the storage medium must contact an electrical contact of the image forming apparatus in a state where the drum unit is attached to a main casing of the image forming apparatus.

In view of the foregoing, it is an object of the present disclosure to provide a drum unit including a storage medium whose electrical contact surface is capable of contacting an external electrical contact.

In order to attain the above and other objects, according to one aspect, the disclosure provides a drum unit including: a frame; a first photosensitive drum; a second photosensitive drum; a charger; and a storage medium. The frame includes: a first frame plate; a second frame; and a third frame plate; and a fourth frame plate. The second frame plate is spaced apart from the first frame plate in a first direction. The first frame plate has one end and another end in a second direction crossing the first direction and the second frame plate has one end and another end in the second direction. The third frame plate extends in the first direction and connects the one end of the first frame plate to the one end of the second frame plate. The fourth frame plate extends in the first direction and connects the another end of the first frame plate to the another end of the second frame plate. The fourth frame plate is spaced apart from the third frame plate in the second direction. The first photosensitive drum is rotatably supported by the first frame plate and the second frame plate about a first axis extending in the first direction. The second photosensitive drum is rotatably supported by the first frame plate and the second frame plate about a second axis extending in the first direction. The second photosensitive drum is spaced apart from the first photosensitive drum in the second direction and is positioned closer to the third frame plate than the first photosensitive drum is to the third frame plate in the second direction. The charger is positioned between the first axis and the second axis in the second direction. The charger is configured to charge an outer circumferential surface of the first photosensitive drum. The storage medium has an electrical contact surface positioned at an outer surface of the third frame plate.

According to another aspect, the disclosure provides an image forming apparatus including: a drum unit; and a casing. The drum unit includes: a frame; a first photosensitive drum; a second photosensitive drum; a charger; and a storage medium. The frame includes: a first frame plate; a second frame; and a third frame plate; and a fourth frame plate. The second frame plate is spaced apart from the first frame plate in a first direction. The first frame plate has one end and another end in a second direction crossing the first direction and the second frame plate has one end and another end in the second direction. The third frame plate extends in the first direction and connects the one end of the first frame plate to the one end of the second frame plate. The fourth frame plate extends in the first direction and connects the another end of the first frame plate to the another end of the second frame plate. The fourth frame plate is spaced apart from the third frame plate in the second direction. The first photosensitive drum is rotatably supported by the first frame plate and the second frame plate about a first axis extending in the first direction. The second photosensitive drum is rotatably supported by the first frame plate and the second frame plate about a second axis extending in the first direction. The second photosensitive drum is spaced apart from the first photosensitive drum in the second direction and is positioned closer to the third frame plate than the first photosensitive drum is to the third frame plate in the second direction. The charger is positioned between the first axis and the second axis in the second direction. The charger is configured to charge an outer circumferential surface of the first photosensitive drum. The storage medium has an electrical contact surface positioned at an outer surface of the third frame plate. The casing has an internal space therein for accommodating the drum unit.

According to still another aspect, the disclosure provides a drum unit configured to be inserted into a casing of an image forming apparatus in an insertion direction. The drum unit includes: a frame; a first photosensitive drum; a second photosensitive drum; and a storage medium. The frame includes: a first frame plate; a second frame plate; a third frame plate; and a fourth frame plate. The first frame plate has an upstream end and a downstream end in the insertion direction. The second frame plate is spaced apart from the first frame plate in a lateral direction crossing the insertion direction. The second frame plate has an upstream end and a downstream end in the insertion direction. The third frame plate extends in the lateral direction and connects the downstream end of the first frame plate to the downstream end of the second frame plate. The fourth frame plate extends in the lateral direction and connects the upstream end of the first frame plate to the upstream end of the second frame plate. The fourth frame plate is spaced apart from the third frame plate in the insertion direction. The first photosensitive drum is rotatably supported by the first frame plate and the second frame plate about a first axis extending in the lateral direction. The second photosensitive drum is rotatably supported by the first frame plate and the second frame plate about a second axis extending in the lateral direction. The second photosensitive drum is positioned downstream of the first photosensitive drum in the insertion direction. The storage medium has an electrical contact surface positioned at an outer surface of the third frame plate.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Figure 1:
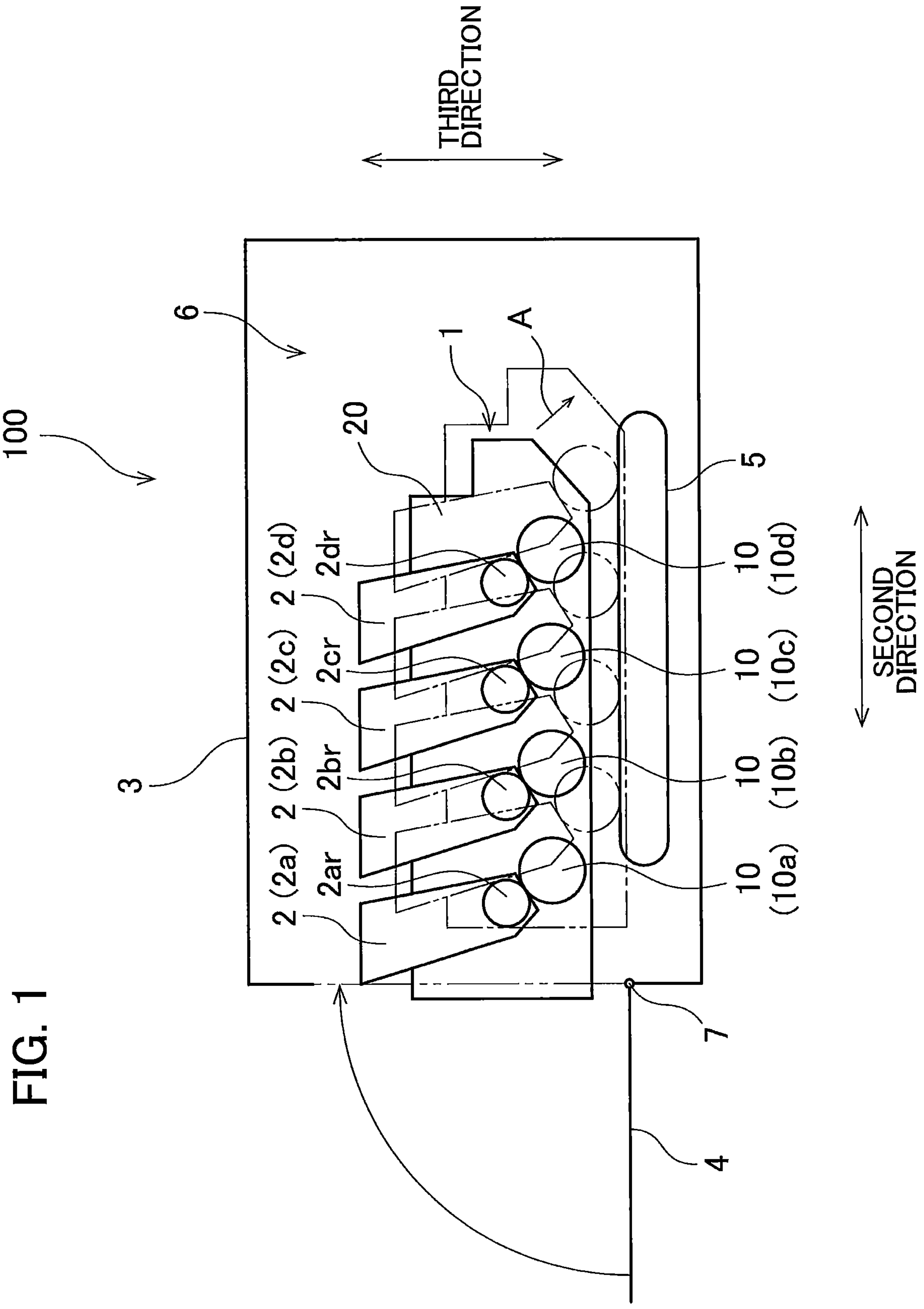
FIG. 1 is a schematic diagram of an image forming apparatus according to one embodiment of the present disclosure.

An image forming apparatus 100 including a drum unit 1 according to one embodiment of the present disclosure will be described with reference to FIGS. 1 through 9.

In the following description, a direction in which axes of photosensitive drums 10 extend will be referred to as a "first direction" (an example of a lateral direction); a direction in which the photosensitive drums 10 are arrayed will be referred to as a "second direction"; and a direction in which the drum unit 1 and a transfer belt 5 of the image forming apparatus 100 are arrayed in a state where the drum unit 1 is in an attached position will be referred to as a "third direction." The first direction and the second direction are crossing each other (preferably, perpendicular to each other). The second direction and the third direction are crossing each other (preferably, perpendicular to each other). The third direction and the first direction are crossing each other (preferably, perpendicular to each other).

<1. Structure of Image Forming Apparatus>

FIG. 1 is a schematic diagram of the image forming apparatus 100. The image forming apparatus 100 is an electro-photographic type image forming apparatus such as a laser printer and an LED printer. As illustrated in FIG. 1, the image forming apparatus 100 includes the drum unit 1, four developing cartridges 2, a casing 3, a cover 4, and the transfer belt 5. The drum unit 1 is configured to hold the four developing cartridges 2. The four developing cartridges 2 are respectively detachably attachable to a frame 20 of the drum unit 1. The casing 3 has an interior space 6. The drum unit 1 is configured to be accommodated within the interior space 6 of the casing 3 in a state where the drum unit 1 holds the four developing cartridges 2.

The image forming apparatus 100 is configured to record images on recording surfaces of printing papers using developer (toner, for example) supplied from the four developing cartridges 2.

The four developing cartridges 2 include a first developing cartridge 2*a*, a second developing cartridge 2*b*, a third developing cartridge 2*c*, and a fourth developing cartridge 2*d*. The first developing cartridge 2*a*, the second developing cartridge 2*b*, the third developing cartridge 2*c*, and the fourth developing cartridge 2*d* are configured to supply developer of different colors.

The first developing cartridge 2*a* includes a first developing roller 2*ar*. The second developing cartridge 2*b* includes a second developing roller 2*br*. The third developing cartridge 2*c* includes a third developing roller 2*cr*. The fourth developing cartridge 2*d* includes a fourth developing roller 2*dr*. Each of the first developing roller 2*ar*, the second developing roller 2*br*, the third developing roller 2*cr*, and the fourth developing roller 2*dr* has a hollow cylindrical shape, and has an outer circumferential surface centered on an axis extending in the first direction. Each of the first developing roller 2*ar*, the second developing roller 2*br*, the third developing roller 2*cr*, and the fourth developing roller 2*dr* is rotatable about the axis extending in the first direction.

The drum unit 1 includes four photosensitive drums 10. Specifically, the drum unit 1 includes a first photosensitive drum 10*a*, a second photosensitive drum 10*b*, a third photosensitive drum 10*c*, and a fourth photosensitive drum 10*d*. Each of the first photosensitive drum 10*a*, the second photosensitive drum 10*b*, the third photosensitive drum 10*c*, and the fourth photosensitive drum 10*d* has a hollow cylindrically shape, and has an outer circumferential surface centered on a center axis extending in the first direction. Further, each of the first photosensitive drum 10*a*, the second photosensitive drum 10*b*, the third photosensitive drum 10*c*, and the fourth photosensitive drum 10*d* is rotatable about the axis extending in the first direction.

When the four developing cartridges 2 are attached to the drum unit 1, the outer circumferential surface of the first developing roller 2*ar* contacts the outer circumferential surface of the first photosensitive drum 10*a*; the outer circumferential surface of the second developing roller 2*br* contacts the outer circumferential surface of the second photosensitive drum 10*b*; the outer circumferential surface of the third developing roller 2*cr* contacts the outer circumferential surface of the third photosensitive drum 10*c*; and the outer circumferential surface of the fourth developing roller 2*dr* contacts the outer circumferential surface of the fourth photosensitive drum 10*d*.

The cover 4 is movable between an open position indicated by a solid line in FIG. 1, and a closed position indicated by a two-dotted chain line in FIG. 1. More specifically, the cover 4 is pivotally movable about an axis of a pivot shaft 7 extending in the first direction. When the cover 4 is in the open position, the interior space 6 of the casing 3 is exposed to the outside. On the other hand, when the cover 4 is in the closed position, the interior space 6 of the casing 3 is closed.

While the cover 4 is in the open position, a user of the image forming apparatus 100 can move the drum unit 1 between a withdrawn position and the attached position via an intermediate position in a state where the four developing cartridges 2 are attached to the drum unit 1. The drum unit 1 in the withdrawn position is positioned outside the casing 3. The drum unit 1 in the attached position is accommodated in the interior space 6 of the casing 3.

In order to attach the drum unit 1 to the image forming apparatus 100, the user first moves the cover 4 to the open position. Next, the user inserts the drum unit 1 into the interior space 6 of the casing 3 in the second direction in a state where the four developing cartridges 2 are attached to the drum unit 1. Accordingly, the drum unit moves from the withdrawn position to the intermediate position. In a state where the drum unit 1 is in the intermediate position, the drum unit 1 faces the transfer belt 5 in the third direction. Subsequently, the user moves the cover 4 from the open position to the closed position.

In accordance with movement of the cover 4 from the open position to the closed position, the drum unit 1 is moved from the intermediate position to the attached position. The drum unit 1 in the attached position is closer to the transfer belt 5 than the drum unit 1 in the intermediate position is to the transfer belt 5. At this time, the drum unit 1 is moved in a fourth direction indicated by an arrow A in FIG. 1. The fourth direction is inclined relative to the second direction and the third direction. More specifically, the fourth direction is a direction in which the first developing roller 2*ar* and the first photosensitive drum 10*a* are arranged in a state where the first developing cartridge 2*a* is attached to the frame 20 of the drum unit 1.

The transfer belt 5 is an annular belt configured to convey printing papers. In a state where the drum unit 1 is in the attached position, the transfer belt 5 is positioned at a first side of the four photosensitive drums 10 in the third direction illustrated in FIG. 1. In other words, the transfer belt 5 faces the four photosensitive drums 10 in the third direction in a state where the drum unit 1 is in the attached position.

Hereinafter, a distance between the outer circumferential surface of the first photosensitive drum 10*a* and an outer circumferential surface of the transfer belt 5 prior to movement of the drum unit 1 in the fourth direction (that is, a distance between the outer circumferential surface of the first photosensitive drum 10*a* of the drum unit 1 in the intermediate position and the outer circumferential surface of the transfer belt 5) will be referred to as a first distance, and a distance between the outer circumferential surface of the first photosensitive drum 10*a* and the outer circumferential surface of the transfer belt 5 after the drum unit 1 has been moved in the fourth direction (that is, a distance between the outer circumferential surface of the first photosensitive drum 10*a* of the drum unit 1 in the attached position and the outer circumferential surface of the transfer belt 5) will be referred to as a second distance. The first distance is greater than the second distance. Hence, as the drum unit 1 is moved in the fourth direction, the four photosensitive drums 10 approach the transfer belt 5. In a state where the drum unit 1 is in the attached position, the outer circumferential surfaces of the four photosensitive drums 10 are in contact with the outer circumferential surface of the transfer belt 5.

<2. Structure of Drum Unit>

Figure 2:
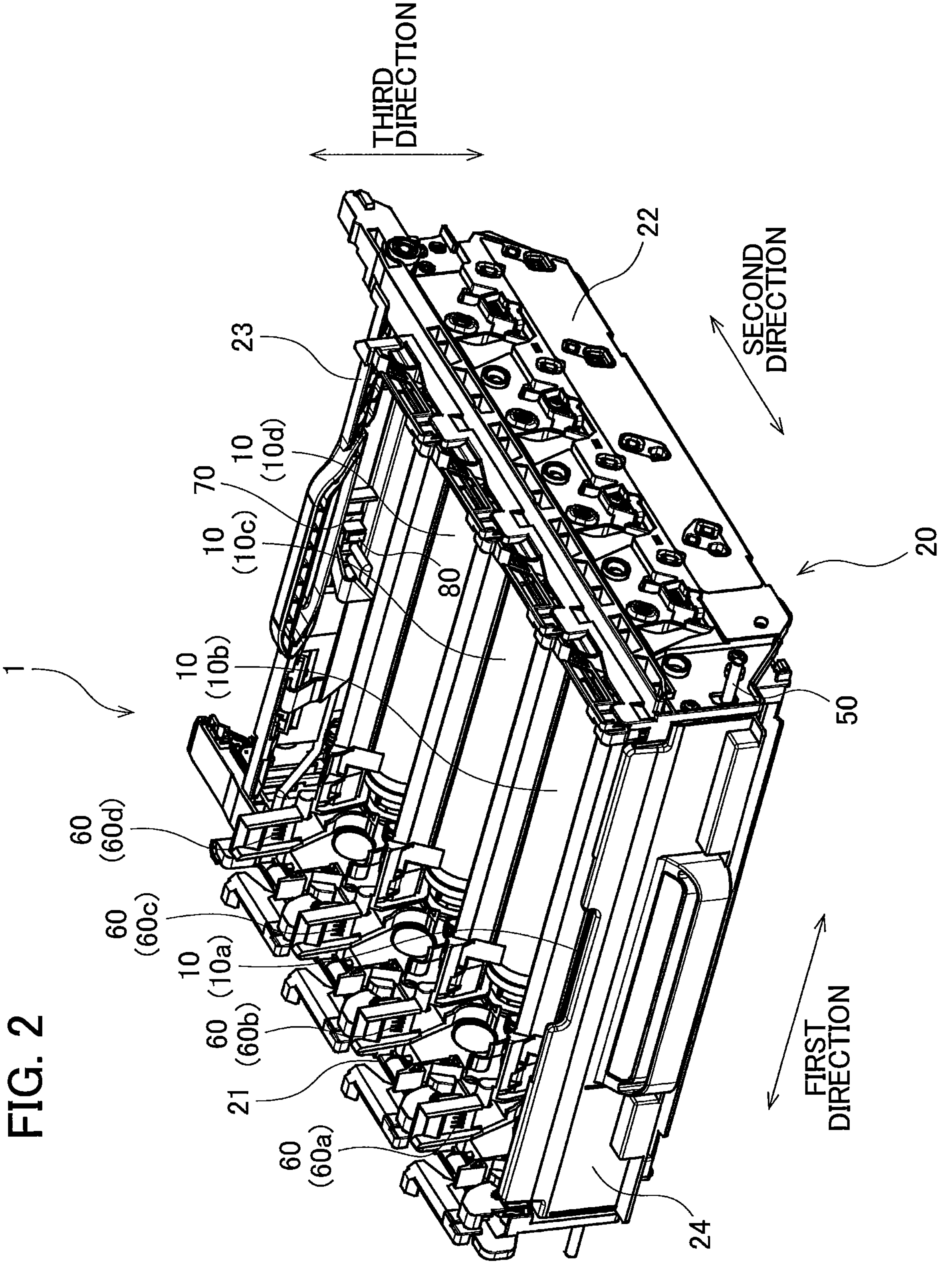
FIG. 2 is a perspective view of a drum unit according to the embodiment.
Figure 3:
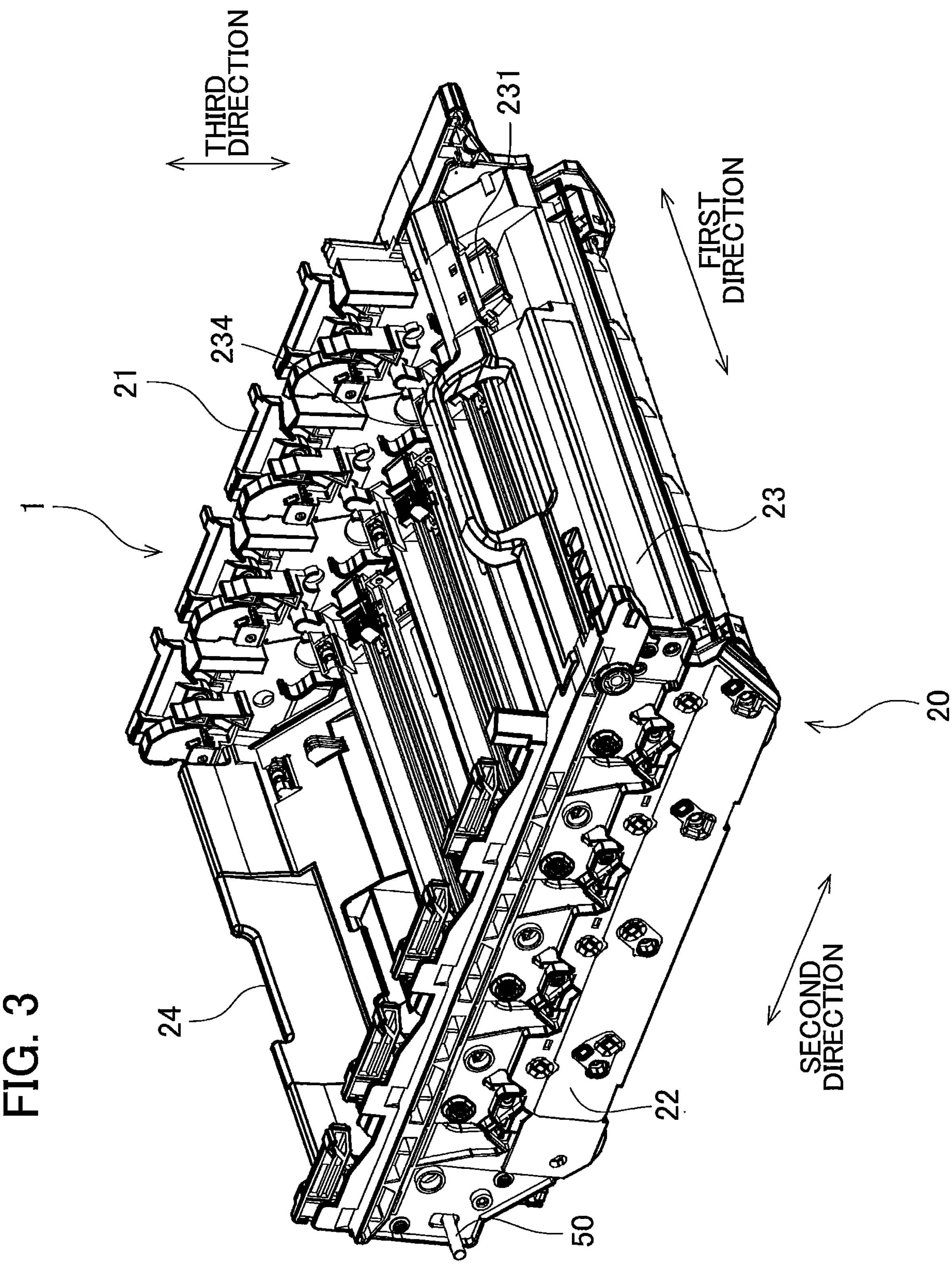
FIG. 3 is another perspective view of the drum unit according to the embodiment.
Figure 4:
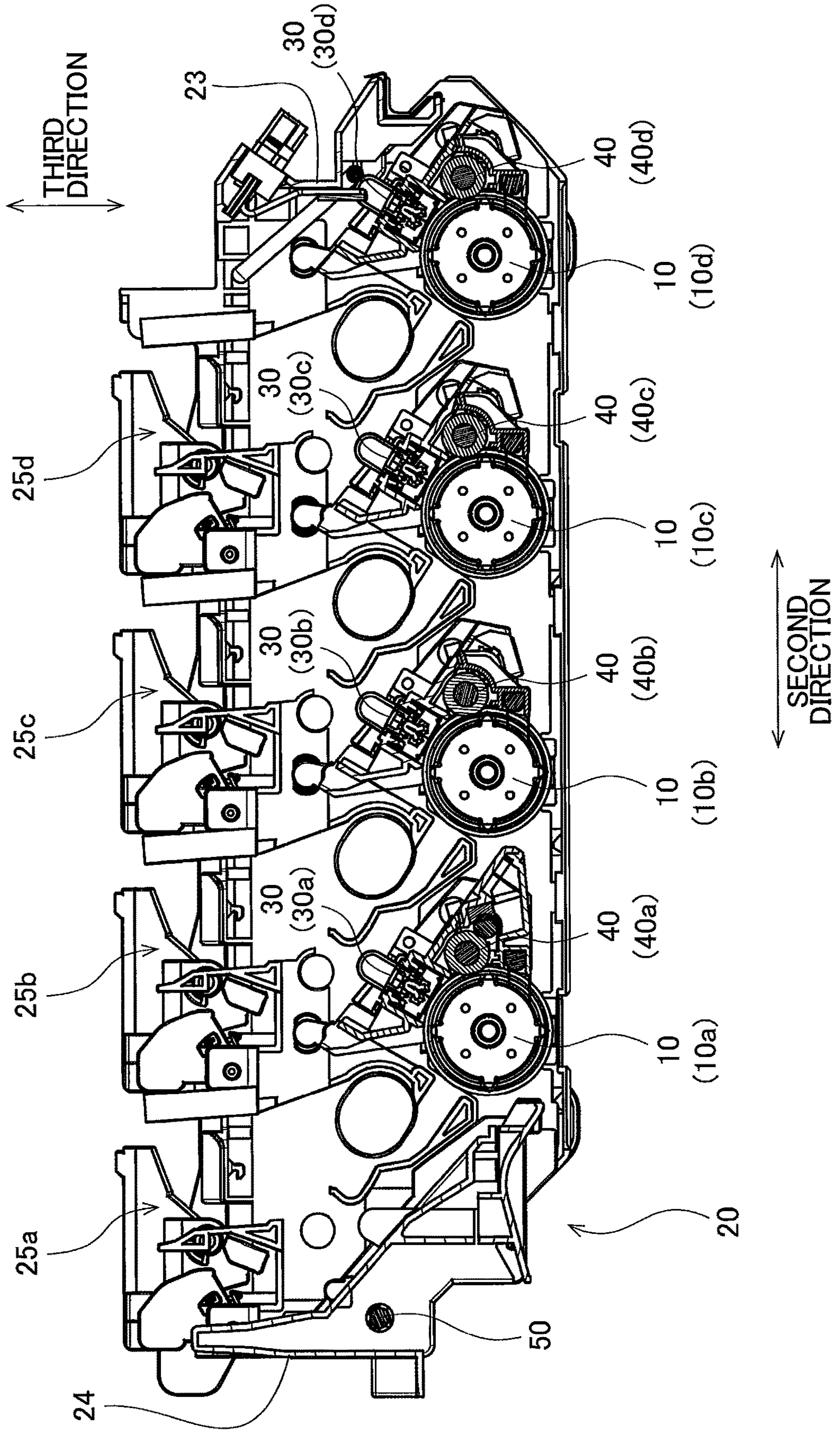
FIG. 4 is a cross-sectional view of the drum unit according to the embodiment.

Next, a structure of the drum unit 1 will be described in greater detail. FIGS. 2 and 3 are perspective views of the drum unit 1. FIG. 4 is a cross-sectional view of the drum unit 1 taken along a plane perpendicular to the first direction.

As illustrated in FIGS. 2 through 4, the drum unit 1 includes the four photosensitive drums 10, the frame 20, four chargers 30, four cleaning members 40, a shaft 50, four electrical terminals 60, a relay board 70, and an IC chip 80 (an example of a memory).

The photosensitive drums 10 are configured to transfer developer supplied from the corresponding developing cartridges 2 onto printing papers. As described above, the drum unit 1 includes the four photosensitive drums 10 including the first photosensitive drum 10*a*, the second photosensitive drum 10*b*, the third photosensitive drum 10*c*, and the fourth photosensitive drum 10*d*. The first photosensitive drum 10*a*, the second photosensitive drum 10*b*, the third photosensitive drum 10*c*, and the fourth photosensitive drum 10*d* are arranged spaced apart from one another at intervals in the second direction. The first photosensitive drum 10*a* is rotatable about a first axis extending in the first direction. The second photosensitive drum 10*b* is rotatable about a second axis extending in the first direction. The third photosensitive drum 10*c* is rotatable about a third axis extending in the first direction. The fourth photosensitive drum 10*d* is rotatable about a fourth axis extending in the first direction.

The second photosensitive drum 10*b* is positioned downstream of the first photosensitive drum 10*a* in a direction in which the drum unit 1 is inserted into the casing 3 of the image forming apparatus 100 (the second direction in the present embodiment). Similarly, the third photosensitive drum 10*c* is positioned downstream of the second photosensitive drum 10*b* in the insertion direction of the drum unit 1, and the fourth photosensitive drum 10*d* is positioned downstream of the third photosensitive drum 10*c* in the insertion direction of the drum unit 1.

The frame 20 is a frame that holds the four photosensitive drums 10. The frame 20 includes a first frame plate 21, a second frame plate 22, a third frame plate 23, and a fourth frame plate 24. The first frame plate 21 is positioned at a first side of the four photosensitive drums 10 in the first direction.

The first frame plate 21 expands perpendicularly to the first direction and is elongated in the second direction. The second frame plate 22 is positioned at a second side of the four photosensitive drums 10 in the first direction. The second frame plate 22 expands perpendicularly to the first direction and is elongated in the second direction. That is, the first frame plate 21 and the second frame plate 22 faces each other in the first direction with the four photosensitive drums 10 interposed therebetween. The four photosensitive drum 10 are rotatably supported by the first frame plate 21 and the second frame plate 22.

The third frame plate 23 is positioned at the first side of the four photosensitive drums 10 in the second direction (the downstream side in the insertion direction). The third frame plate 23 extends in the first direction. The third frame plate 23 connects one end of the first side of the first frame plate 21 in the second direction to one end of the first side of the second frame plate 22 in the second direction. The fourth frame plate 24 is positioned at a second side of the photosensitive drums 10 in the second direction (the upstream side in the insertion direction). The fourth frame plate 24 extends in the first direction. The fourth frame plate 24 connects one end of the second side of the first frame plate 21 in the second direction to one end of the second side of the second frame plate 22 in the second direction.

As illustrated in FIG. 4, the frame 20 has a first opening 25*a*, a second opening 25*b*, a third opening 25*c*, and a fourth opening 25*d*. The first opening 25*a* is communicated in the fourth direction with a space at which the first photosensitive drum 10*a* is positioned. When the first developing cartridge 2*a* is attached to the frame 20, the first developing roller 2*ar* of the first developing cartridge 2*a* passes through the first opening 25*a* and is inserted into the space toward the first photosensitive drum 10*a*. The second opening 25*b* is communicated in the fourth direction with a space at which the second photosensitive drum 10*b* is positioned. When the second developing cartridge 2*b* is attached to the frame 20, the second developing roller 2*br* of the second developing cartridge 2*b* passes through the second opening 25*b* and is inserted into the space toward the second photosensitive drum 10*b*.

The third opening 25*c* is communicated in the fourth direction with a space at which the third photosensitive drum 10*c* is positioned. When the third developing cartridge 2*c* is attached to the frame 20, the third developing roller 2*cr* of the third developing cartridge 2*c* passes through the third opening 25*c* and is inserted into the space toward the third photosensitive drum 10*c*. The fourth opening 25*d* is communicated in the fourth direction with a space at which the fourth photosensitive drum 10*d* is positioned. When the fourth developing cartridge 2*d* is attached to the frame 20, the fourth developing roller 2*dr* of the fourth developing cartridge 2*d* passes through the fourth opening 25*d* and is inserted into the space toward the fourth photosensitive drum 10*d*.

The third frame plate 23 is positioned opposite to a first cleaning member 40*a* (described later) with respect to the second photosensitive drum 10*b* in the second direction. The fourth frame plate 24 is positioned opposite to the first cleaning member 40*a* with respect to the first photosensitive drum 10*a* in the second direction. The third frame plate 23 is positioned opposite to the first photosensitive drum 10*a* with respect to the second opening 25*b* in the second direction. The fourth frame plate 24 is positioned opposite to the first photosensitive drum 10*a* with respect to the first opening 25*a* in the second direction. The third frame plate 23 has an outer surface positioned opposite to the shaft 50 (described later) with respect to the first photosensitive drum 10*a* in the second direction. The fourth frame plate 24 has an outer surface positioned opposite to the first photosensitive drum 10*a* with respect to the shaft 50 in the second direction.

The chargers 30 are configured to charge the outer circumferential surfaces of the corresponding photosensitive drums 10 in accordance with the image to be printed. The drum unit 1 includes four chargers 30, namely, a first charger 30*a*, a second charger 30*b*, a third charger 30*c*, and a fourth charger 30*d*. The first charge 30*a* is positioned between the first axis of the first photosensitive drum 10*a* and the second axis of the second photosensitive drum 10*b* in the second direction. The first charger 30*a* is configured to charge the outer circumferential surface of the first photosensitive drum 10*a* from the first side of the first axis in the second direction. The second charger 30*b* is positioned between the second axis of the second photosensitive drum 10*b* and the third axis of the third photosensitive drum 10*c* in the second direction. The second charger 30*b* is configured to charge the outer circumferential surface of the second photosensitive drum 10*b* from the first side of the second axis in the second direction. The third charger 30*c* is positioned between the third axis of the third photosensitive drum 10*c* and the fourth axis of the fourth photosensitive drum 10*d* in the second direction. The third charger 30*c* is configured to charge the outer circumferential surface of the third photosensitive drum 10*c* from the first side of the third axis in the second direction. The fourth charger 30*d* is positioned between the fourth axis of the fourth photosensitive drum 10*d* and the third frame plate 23 in the second direction. The fourth charger 30*d* is configured to charge the outer circumferential surface of the fourth photosensitive drum 10*d* from the first side of the fourth axis in the second direction.

In the present embodiment, the chargers 30 have scorotron chargers. However, instead of scorotron chargers, the chargers 30 may have another type of charging means, such as charging rollers.

The cleaning members 40 are configured to remove developer adhering to the outer circumferential surfaces of the corresponding photosensitive drums 10. The drum unit 1 includes four cleaning members 40 including the first cleaning member 40*a*, a second cleaning member 40*b*, a third cleaning member 40*c*, and a fourth cleaning member 40*d*.

The first cleaning member 40*a* is positioned between the first photosensitive drum 10*a* and the second photosensitive drum 10*b* (that is, between the first axis and the second axis) in the second direction. The first cleaning member 40*a* is in contact with the outer circumferential surface of the first photosensitive drum 10*a* to remove developer therefrom. The second cleaning member 40*b* is positioned between the second photosensitive drum 10*b* and the third photosensitive drum 10*c* (that is, between the second axis and the third axis) in the second direction. The second cleaning member 40*b* is in contact with the outer circumferential surface of the second photosensitive drum 10*b* to remove developer therefrom. The third cleaning member 40*c* is positioned between the third photosensitive drum 10*c* and the fourth photosensitive drum 10*d* (that is, between the third axis and the fourth axis) in the second direction. The third cleaning member 40*c* is in contact with the outer circumferential surface of the third photosensitive drum 10*c* to remove developer therefrom. The fourth cleaning member 40*d* is positioned at the first side of the fourth photosensitive drum 10*d* (that is, between the fourth axis and the third frame plate 23) in the second direction. The fourth cleaning member 40*d* is in contact with the outer circumferential surface of the fourth photosensitive drum 10*d* to remove developer therefrom.

In the present embodiment, the cleaning members 40 have the cleaning rollers. However, instead of cleaning rollers, the cleaning members 40 may have another type of cleaning means, such as cleaning blades.

The shaft 50 functions to fix the drum unit 1 in the attached position relative to the casing 3 when the drum unit 1 is accommodated in the interior space 6 of the casing 3. The shaft 50 is positioned at the second side of the first photosensitive drum 10*a* in the second direction. In other words, the shaft 50 is positioned between the fourth frame plate 24 and the first photosensitive drum 10*a* in the second direction. The shaft 50 extends in the first direction. One end of the shaft 50 in the first direction is positioned opposite to the second frame plate 22 relative to the first frame plate 21. Another end of the shaft 50 in the first direction is positioned opposite to the first frame plate 21 relative to the second frame plate 22. That is, the shaft 50 penetrates the first frame plate 21 and the second frame plate 22 in the first direction.

When the drum unit 1 is accommodated in the interior space 6 of the casing 3, both ends of the shaft 50 in the first direction contact portions of the casing 3. With this configuration, the shaft 50 is fixed in position relative to the casing 3. Accordingly, the drum unit 1 is fixed in position relative to the casing 3.

The electrical terminals 60 are conductors. The electrical terminals 60 are configured to be electrically connected to IC chips of the developing cartridges 2. One electrical terminal 60 is provided for each photosensitive drum 10. That is, the drum unit 1 includes four electrical terminals 60, including a first electrical terminal 60*a*, a second electrical terminal 60*b*, a third electrical terminal 60*c*, and a fourth electrical terminal 60*d*. Four electrical terminals 60 are positioned between the first frame plate 21 and the second frame plate 22 in the first direction. Further, electrical terminals 60 are positioned between the third frame plate 23 and the fourth frame plate 24 in the second direction.

When the first developing cartridge 2*a* is attached to the drum unit 1, the first electrical terminal 60*a* contacts an electrical contact surface of the IC chip of the first developing cartridge 2*a*. When the second developing cartridge 2*b* is attached to the drum unit 1, the second electrical terminal 60*b* contacts an electrical contact surface of the IC chip of the second developing cartridge 2*b*. When the third developing cartridge 2*c* is attached to the drum unit 1, the third electrical terminal 60*c* contacts an electrical contact surface of the IC chip of the third developing cartridge 2*c*. When the fourth developing cartridge 2*d* is attached to the drum unit 1, the fourth electrical terminal 60*d* contacts an electrical contact surface of the IC chip of the fourth developing cartridge 2*d*.

Figure 5:
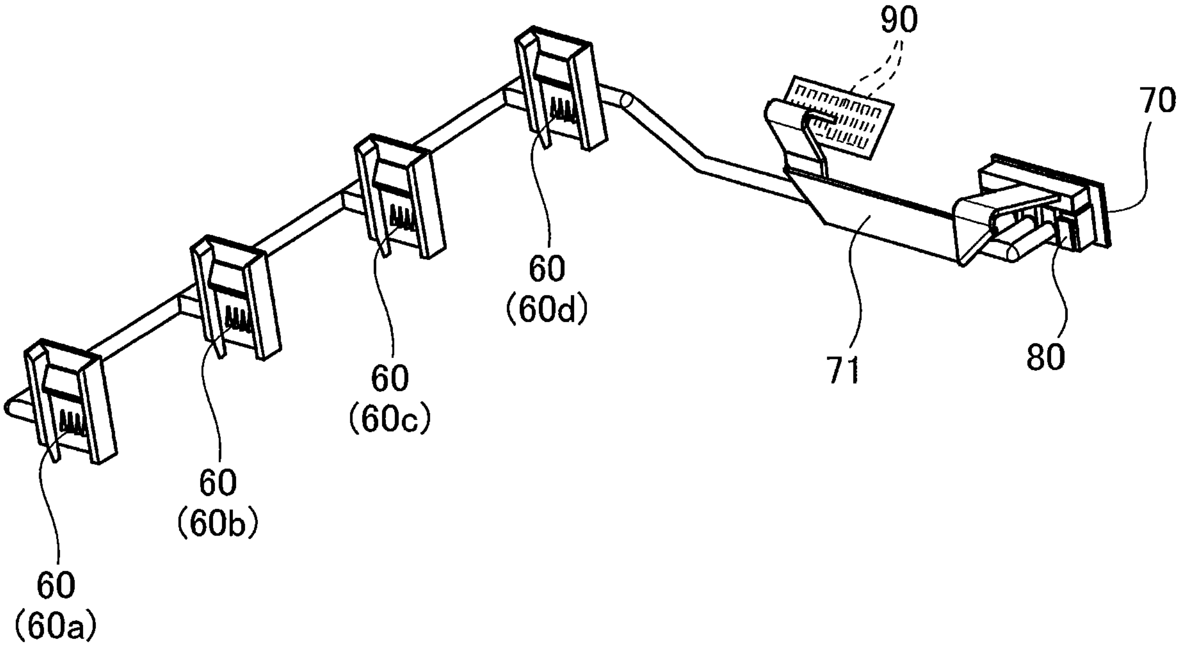
FIG. 5 is a perspective view of four electrical terminals, an IC chip, eight electrical contact surfaces, and a wire according to the embodiment.

The relay board 70 is a circuit board. The relay board 70 is configured to electrically connect the four electrical terminals 60, the IC chip 80 (described later), and a plurality of electrical contact surfaces 90 (described later) to each other. The relay board 70 is positioned at an inner surface of the third frame plate 23 (i.e., the surface of the third frame plate 23 facing the fourth frame plate 24 in the second direction). FIG. 5 is a perspective view illustrating the four electrical terminals 60, the IC chip 80, the eight electrical contact surfaces 90, and a wire 71 interconnecting these components. As illustrated in FIG. 5, the relay board 70 is electrically connected to each of the first electrical terminal 60*a*, the second electrical terminal 60*b*, the third electrical terminal 60*c*, the fourth electrical terminal 60*d*, the IC chip 80, and the electrical contact surfaces 90 through the wire 71. The wire 71 has a portion extending along the inner surface of the third frame plate 23, and another portion extending along the inner surface of the first frame plate 21.

The IC chip 80 is a small integrated circuit including memory. As illustrated in FIGS. 2 and 5, the IC chip 80 is fixed to a surface of the relay board 70 in the second direction. In other words, the IC chip 80 is positioned at a surface of the relay board 70 facing the fourth frame plate 24 in the second direction. However, the IC chip 80 may be positioned at another position in the drum unit 1. The memory on the IC chip 80 stores various information relating to the drum unit 1. For example, the memory may store information on the expected service life of the photosensitive drums 10.

<3. Electrical Contact Surfaces>

As described above, the drum unit 1 includes the plurality of electrical contact surfaces 90. The electrical contact surfaces 90 are conductive metal. The electrical contact surfaces 90 are fixed to the third frame plate 23 either directly or through other components. When the drum unit 1 is attached to the casing 3 of the image forming apparatus 100, the electrical contact surfaces 90 contact electrical contacts of the image forming apparatus 100. Next, the electrical contact surfaces 90 will be described in greater detail.

Figure 6:
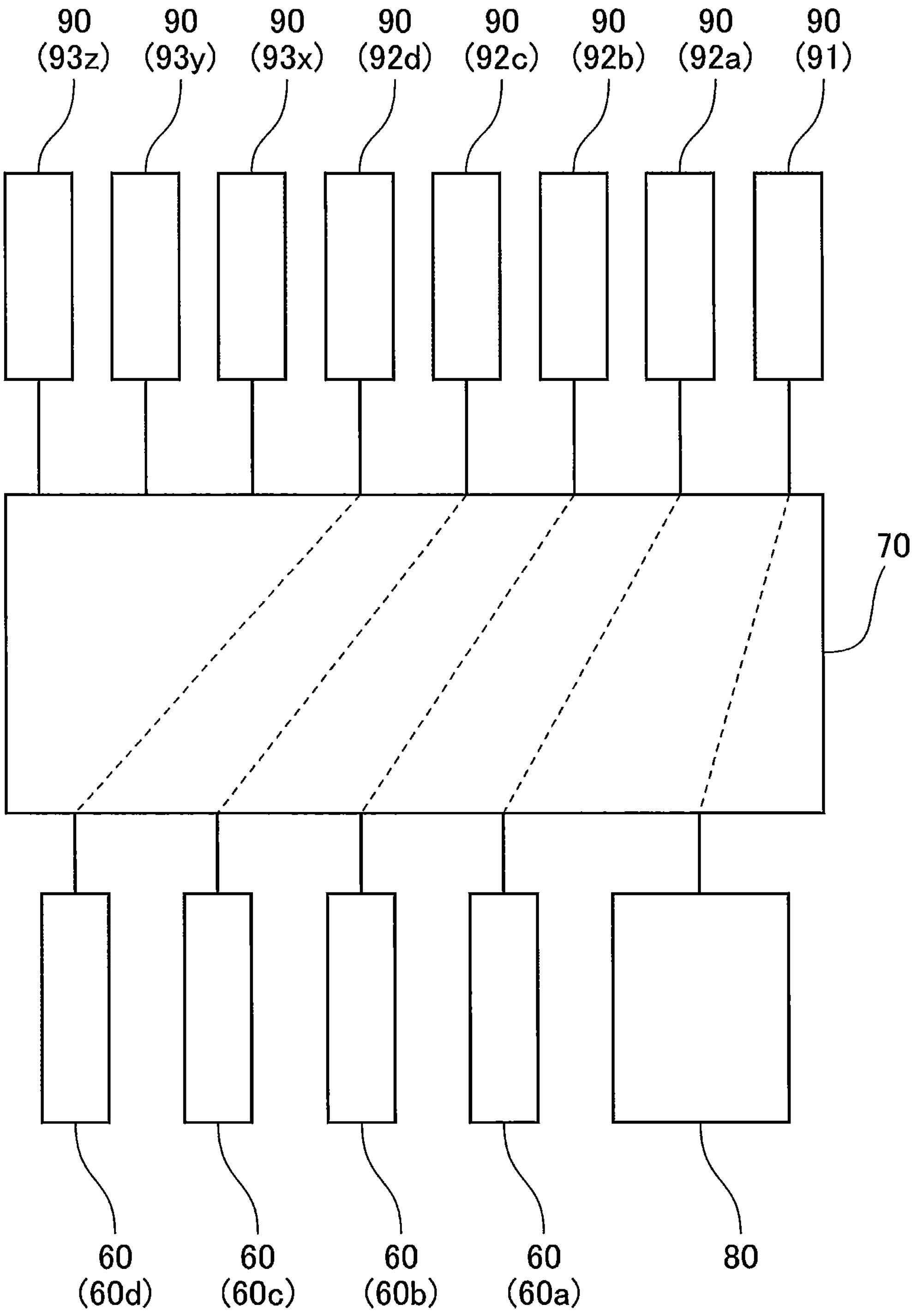
FIG. 6 is a block diagram illustrating electrical connection relationship among the four electrical terminals, the IC chip, and the eight electrical contact surfaces.

FIG. 6 is a block diagram illustrating relationships of electrical connections among the four electrical terminals 60, the IC chip 80, and the eight electrical contact surfaces 90. As illustrated in FIG. 6, the drum unit 1 according to the present embodiment has one first electrical contact surface 91; four second electrical contact surfaces 92*a*, 92*b*, 92*c*, and 92*d*; and three third electrical contact surfaces 93*x*, 93*y*, and 93*z* for a total of eight electrical contact surfaces 90. The IC chip 80 and the electrical contact surface 90 constitute an example of a storage medium in the present disclosure.

The first electrical contact surface 91 is electrically connected to the IC chip 80 through the relay board 70. The first electrical contact surface 91 is an electrode for inputting information into and outputting information from the IC chip 80. That is, the IC chip 80 is configured to receive inputted electrical signals specifying information and outputs electrical signals specifying information through the first electrical contact surface 91.

The second electrical contact surface 92*a* is electrically connected to the first electrical terminal 60*a* through the relay board 70. The second electrical contact surface 92*a* is an electrode for inputting information into and outputting information from the IC chip on the first developing cartridge 2*a* in contact with the first electrical terminal 60*a*. The second electrical contact surface 92*b* is electrically connected to the second electrical terminal 60*b* through the relay board 70. The second electrical contact surface 92*b* is an electrode that inputs information into and outputs information from the IC chip on the second developing cartridge 2*b* in contact with the second electrical terminal 60*b*. The second electrical contact surface 92*c* is electrically connected to the third electrical terminal 60*c* through the relay board 70. The second electrical contact surface 92*c* is an electrode that inputs information into and outputs information from the IC chip on the third developing cartridge 2*c* in contact with the third electrical terminal 60*c*. The second electrical contact surface 92*d* is electrically connected to the fourth electrical terminal 60*d* through the relay board 70. The second electrical contact surface 92*d* is an electrode for inputting information into and outputting information from the IC chip on the fourth developing cartridge 2*d* in contact with the fourth electrical terminal 60*d*.

The third electrical contact surface 93*x* is electrically connected to the IC chip 80, the first electrical terminal 60*a*, the second electrical terminal 60*b*, the third electrical terminal 60*c*, and the fourth electrical terminal 60*d* through the relay board 70. The third electrical contact surface 93*x* is an electrode configured to supply electric power to the IC chip 80, the first electrical terminal 60*a*, the second electrical terminal 60*b*, the third electrical terminal 60*c*, and the fourth electrical terminal 60*d*. The third electrical contact surface 93*y* is electrically connected to the IC chip 80, the first electrical terminal 60*a*, the second electrical terminal 60*b*, the third electrical terminal 60*c*, and the fourth electrical terminal 60*d* through the relay board 70. The third electrical contact surface 93*y* is an electrode for outputting a clock signal to the IC chip 80, the first electrical terminal 60*a*, the second electrical terminal 60*b*, the third electrical terminal 60*c*, and the fourth electrical terminal 60*d*. The third electrical contact surface 93*z* is electrically connected to the IC chip 80, the first electrical terminal 60*a*, the second electrical terminal 60*b*, the third electrical terminal 60*c*, and the fourth electrical terminal 60*d* through the relay board 70. The third electrical contact surface 93*z* is an electrode that supplies a ground voltage to the IC chip 80, the first electrical terminal 60*a*, the second electrical terminal 60*b*, the third electrical terminal 60*c*, and the fourth electrical terminal 60*d*.

The electrical contact surfaces 90 are arranged spaced apart from each other in the first direction. However, the order in which the eight electrical contact surfaces 90 are arranged is not limited to that illustrated in FIG. 6.

Figure 7:
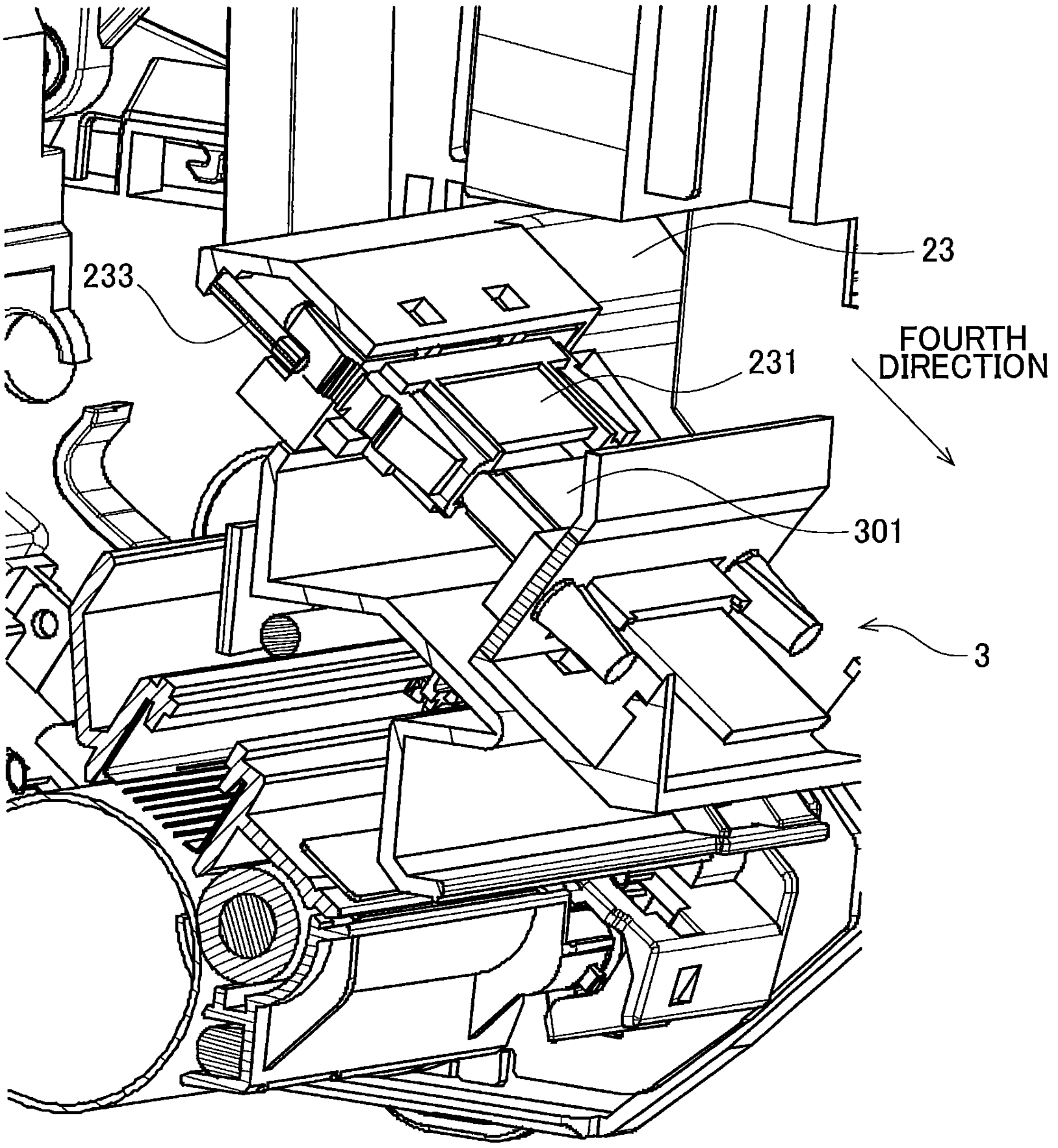
FIG. 7 is a partial perspective view of the image forming apparatus according to the embodiment, particularly illustrating a portion adjacent to the electrical contact surfaces.
Figure 8:
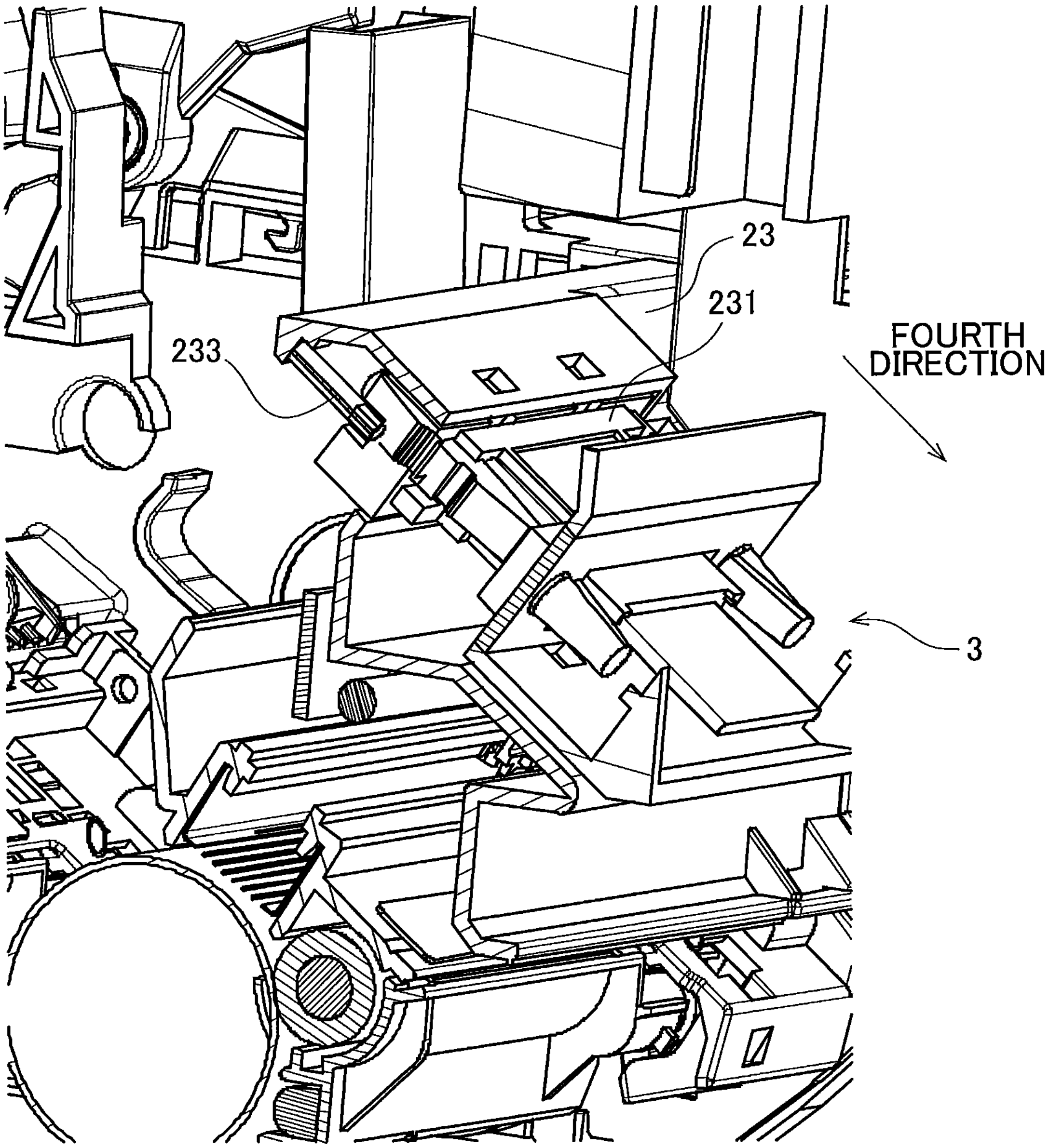
FIG. 8 is another partial perspective view of the image forming apparatus according to the embodiment, particularly illustrating a portion adjacent to the electrical contact surfaces.

FIGS. 7 and 8 are partial perspective views of the image forming apparatus 100 illustrating a portion in the vicinity of the electrical contact surfaces 90. FIG. 7 illustrates a state in which the electrical contact surfaces 90 are not contacting the electrical contacts in the image forming apparatus 100, while FIG. 8 illustrates a state in which the electrical contact surfaces 90 are in contact with the electrical contacts in the image forming apparatus 100.

Figure 9:
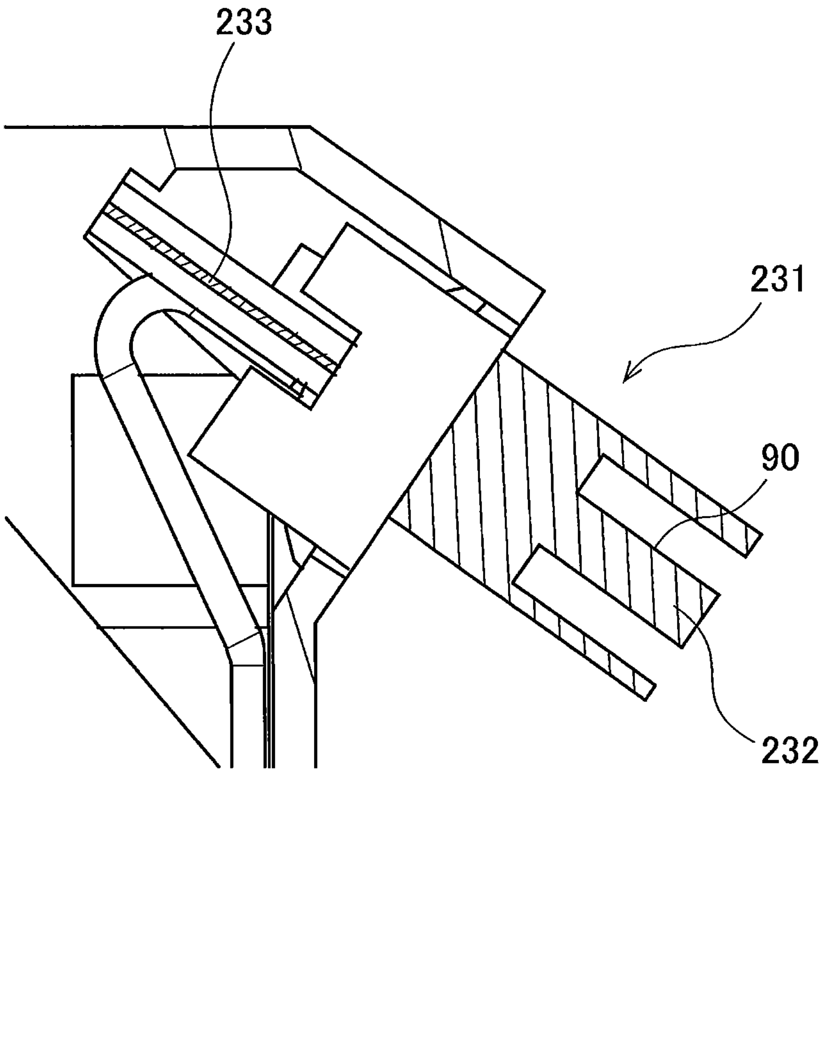
FIG. 9 is a cross-sectional view of a drum unit-side connector provided in the drum unit according to the embodiment.

As illustrated in FIGS. 7 and 8, a drum unit-side connector 231 is positioned at the outer surface of the third frame plate 23 in the present embodiment. That is, the outer surface of the third frame plate 23 is positioned at the first side of the third frame in the second direction. More specifically, the drum unit-side connector 231 protrudes in the fourth direction from the third frame plate 23. The drum unit-side connector 231 has eight electrical contact surfaces 90. FIG. 9 is a cross-sectional view of the drum unit-side connector 231. As illustrated in FIG. 9, the drum unit-side connector 231 includes a plurality of protrusions 232 protruding in the fourth direction. The electrical contact surfaces 90 are positioned at the outer surface of the protrusions 232.

As illustrated in FIG. 7, the casing 3 of the image forming apparatus 100 includes a device-side connector 301. The device-side connector 301 includes eight electrical contacts (not illustrated, an example of a device-side contact) configured to contact the corresponding eight electrical contact surfaces 90.

To attach the drum unit 1 to the image forming apparatus 100, the user first inserts the drum unit 1 into the interior space 6 of the casing 3 along the second direction, as described above. Subsequently, the user moves the cover 4 to the closed position. Accordingly, the drum unit 1 is moved in the fourth direction. Through this operation, the drum unit-side connector 231 is fitted into the device-side connector 301, as illustrated in FIG. 8. As a result, the eight electrical contact surfaces 90 of the drum unit-side connector 231 contact the eight electrical contacts of the device-side connector 301.

As described above, the electrical contact surfaces 90 in the drum unit 1 according to the present embodiment are positioned at the outer surface of the third frame plate 23. Therefore, when the drum unit 1 is attached to the image forming apparatus 100, the electrical contact surfaces 90 contact the electrical contacts of the casing 3 of the image forming apparatus 100. Accordingly, the IC chip 80 of the drum unit 1 is electrically connected to the electrical contacts of the casing 3 of the image forming apparatus 100.

In the present embodiment, the electrical contact surfaces 90 are movable in the fourth direction relative to the third frame plate 23. That is, the electrical contact surfaces 90 are movable relative to the third frame plate 23 in the second direction and the third direction. A coil spring 233 is positioned between the outer surface of the third frame plate 23 and the electrical contact surfaces 90. The coil spring 233 is an elastic member. The coil spring 233 is configured to expand and contract in the fourth direction between a first state and a second state in which a length of the coil spring 233 in the fourth direction is shorter than a length of the coil spring 233 in the first state.

The coil spring 233 is in the first state in a state where the electrical contact surfaces 90 are separated from the electrical contacts of the image forming apparatus 100. At this time, a length between the third frame plate 23 and the electrical contact surfaces 90 in the fourth direction is a first length. The coil spring 233 is in the second state in a state where the electrical contact surfaces 90 contact the electrical contacts of the image forming apparatus 100. At this time, a length between the third frame plate 23 and the electrical contact surfaces 90 in the fourth direction is a second length. The second length is shorter than the first length.

Since the electrical contact surfaces 90 are configured to move in the fourth direction in this way, the electrical contact surfaces 90 contact the electrical contacts in the image forming apparatus 100 while reducing contact pressure between the electrical contacts and the electrical contact surfaces 90. In the present embodiment, the coil spring 233 is used as an elastic member. However, instead of the coil spring 233, the elastic member may be other types of elastic member, such as a torsion spring or a cushioning material. Further, deformation of the elastic member may allow the electrical contact surfaces 90 to move in a direction crossing the fourth direction (the first direction, for example) rather than in the fourth direction (the second direction and the third direction). In other words, the electrical contact surfaces 90 should be movable at least in one of the first direction, the second direction, and the third direction.

As illustrated in FIG. 3, a handle 234 is also positioned at the outer surface of the third frame plate 23 in the present embodiment. The handle 234 is positioned between one end of the third frame plate 23 in the first direction and another end of the third frame plate 23 in the first direction. The one end of the third frame plate 23 in the first direction is positioned at the first side of the third frame plate 23 in the first direction. The other end of the third frame plate 23 in the first direction is positioned at the second side of the third frame plate 23 in the first direction. In the present embodiment, the drum unit-side connector 231 having the electrical contact surfaces 90 is positioned closer to the one end of the third frame plate 23 in the first direction than the handle 234 is to the one end of the third frame plate 23 in the first direction. Accordingly, the electrical contact surfaces 90 are positioned closer to the one end of the third frame plate 23 in the first direction than to the other end of the third frame plate 23 in the first direction.

However, the drum unit-side connector 231 including the electrical contact surfaces 90 may be positioned closer to the other end of the third frame plate 23 in the first direction than the handle 234 is to the other end of the fourth frame plate 24 in the first direction. That is, the electrical contact surfaces 90 may be positioned closer to the other end of the third frame plate 23 in the first direction than to the one end of the third frame plate 23 in the first direction.

Alternatively, the electrical contact surfaces 90 may be positioned between one end of the handle 234 in the first direction and another end of the handle 234 in the first direction.

<4. Modifications of the Embodiment>

While the description has been made in detail with reference to the embodiment thereof, it would be apparent to those skilled in the art that many modifications and variations may be made therein without departing from the spirit of the disclosure. Next, various modifications of the embodiment will be described while focusing on points of difference from the embodiment described above.

<4-1. First Modification>

Figure 10:
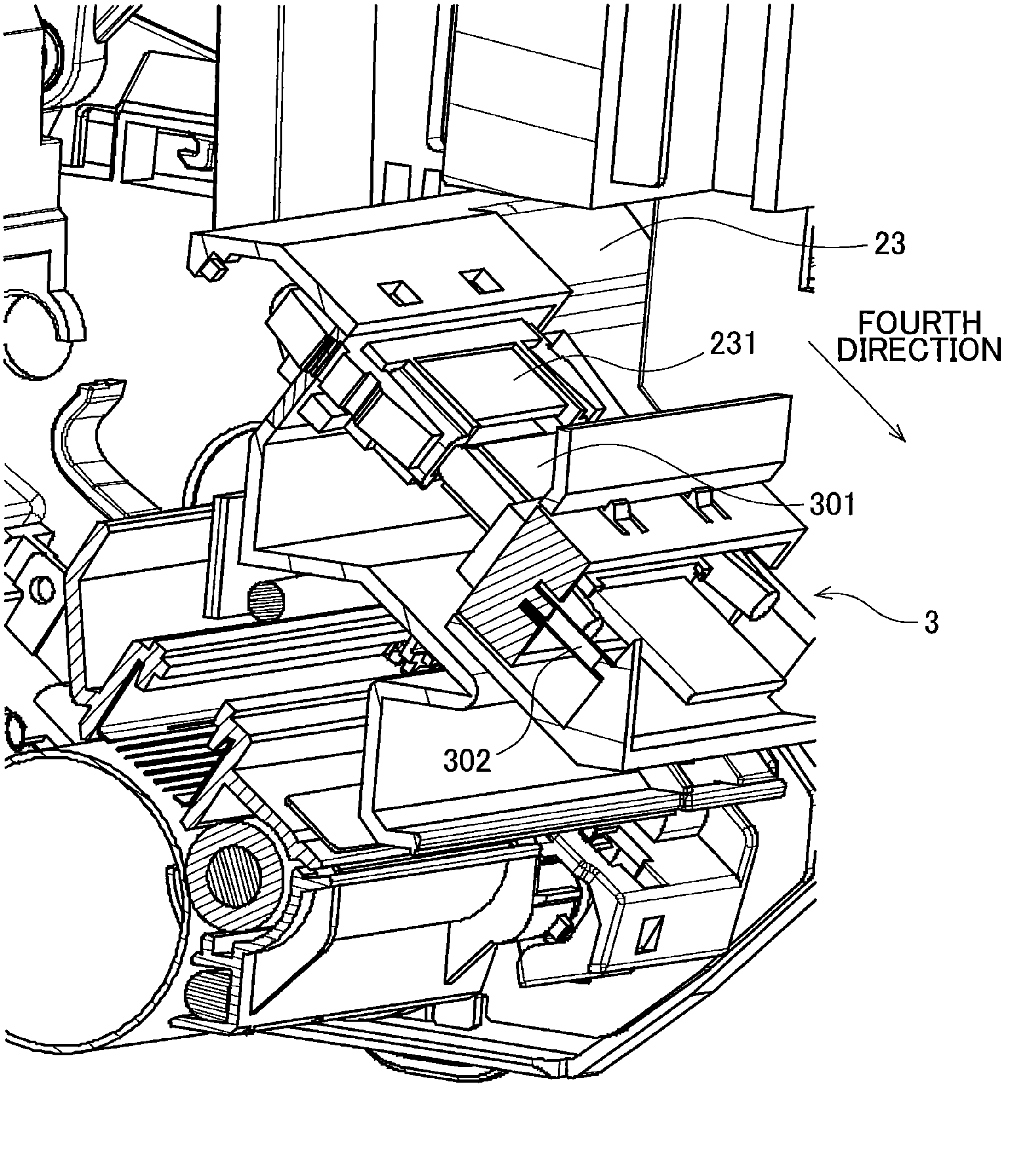
FIG. 10 is a partial perspective view of an image forming apparatus according to a first modification.

FIG. 10 is a partial perspective view of an image forming apparatus 100 according to a first modification. In the embodiment described above, the coil spring 233 is positioned between the outer surface of the third frame plate 23 and the electrical contact surfaces 90. However, in the first modification, the coil spring 233 is not positioned between the outer surface of the third frame plate 23 and the electrical contact surfaces 90. Instead, a coil spring 302 is positioned between the casing 3 of the image forming apparatus 100 and the device-side connector 301. The coil spring 302 is an elastic member configured to expand and contract in the fourth direction between a third state and a fourth state in which a length of the coil spring 302 in the fourth direction is shorter than a length of the coil spring 302 in the third state.

The coil spring 302 is in the third state in a state where the electrical contact surfaces 90 are separated from the electrical contacts of the image forming apparatus 100. At this time, a length between the casing 3 of the image forming apparatus 100 and the electrical contacts in the fourth direction is a third length. The coil spring 302 is in the fourth state in a state where the electrical contact surfaces 90 contact the electrical contacts of the image forming apparatus 100. At this time, a length between the casing 3 of the image forming apparatus 100 and the electrical contacts in the fourth direction is a fourth length. The fourth length is shorter than the third length.

By enabling the electrical contacts of the image forming apparatus 100 to be elastically displaced in the fourth direction in this way, the electrical contact surfaces 90 contact the electrical contacts in the image forming apparatus 100 while reducing contact pressure between the electrical contacts and the electrical contact surfaces 90. Note that the coil spring 302 is used as the elastic member in the first modification. However, instead of the coil spring 302, the elastic member may be other types of elastic member, such as a torsion spring or a cushioning material.

<4-2. Second Modification>

Figure 11:
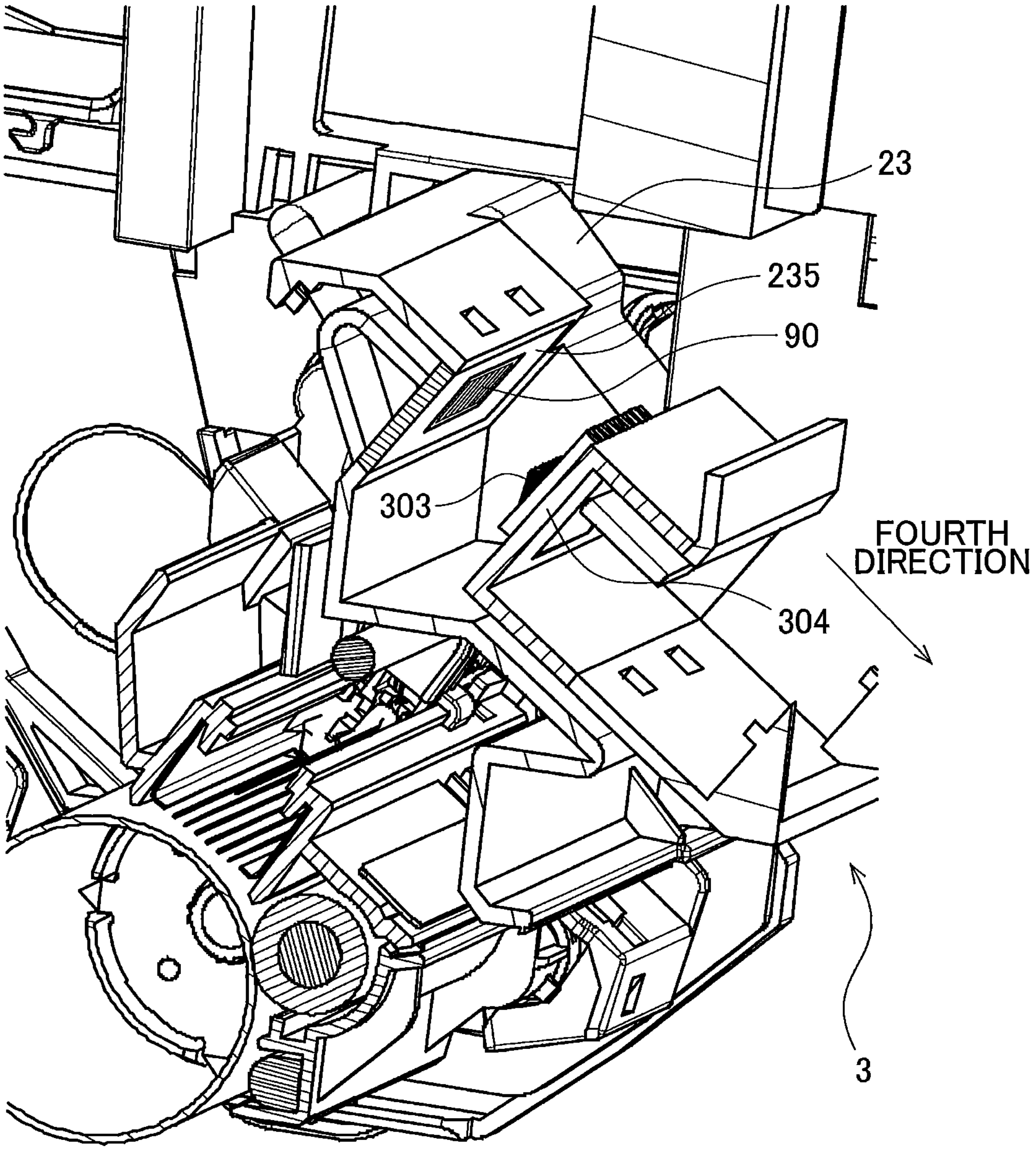
FIG. 11 is a partial perspective view of an image forming apparatus according to a second modification.
Figure 12:
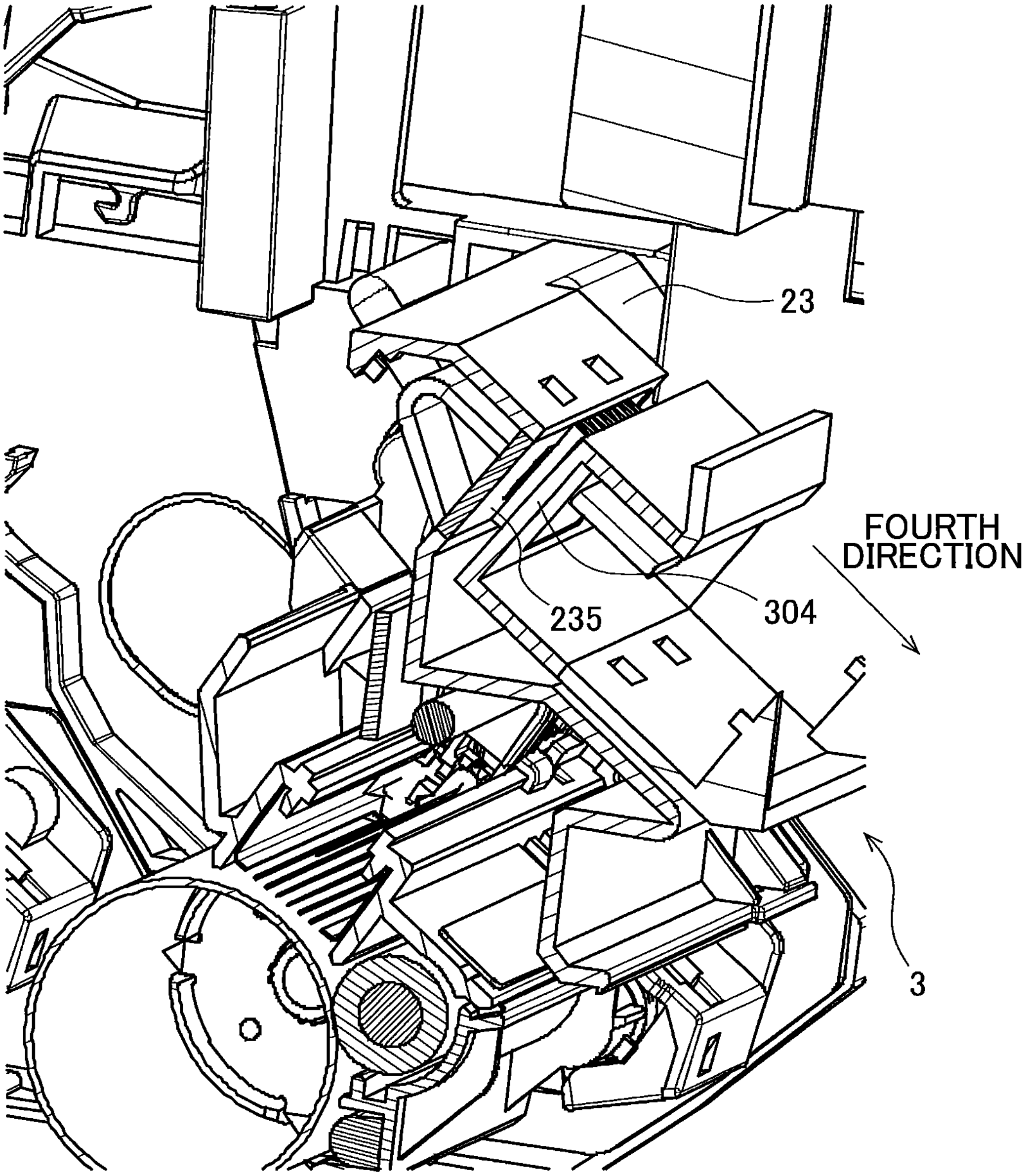
FIG. 12 is another partial perspective view of the image forming apparatus according to the second modification.

FIGS. 11 and 12 are partial perspective views of an image forming apparatus 100 according to a second modification. FIG. 11 illustrates a state in which the electrical contact surfaces 90 are not contacting electrical contacts 303 of the image forming apparatus 100. FIG. 12 illustrates a state in which the electrical contact surfaces 90 are contacting the electrical contacts 303 in the image forming apparatus 100.

In the embodiment and the first modification described above, the drum unit-side connector 231 has the electrical contact surfaces 90, and the drum unit-side connector 231 is positioned at the outer surface of the third frame plate 23. However, in the second modification, a circuit board 235 has the electrical contact surfaces 90. The circuit board 235 has a flat shape. The circuit board 235 is positioned at the outer surface of the third frame plate 23. Specifically, the electrical contact surfaces 90 are positioned at the outer surface of the circuit board 235. The electrical contact surfaces 90 face in the fourth direction.

When attaching the drum unit 1 to the image forming apparatus 100, the user first inserts the drum unit 1 into the interior space 6 of the casing 3 along the second direction. Subsequently, the user closes the cover 4. Accordingly, drum unit 1 is moved in the fourth direction. Through this action, the electrical contact surfaces 90 contact the electrical contacts 303 of the image forming apparatus 100, as illustrated in FIG. 12. Even with the above configuration, the electrical contact surfaces 90 contact the electrical contacts 303 of the casing 3 of the image forming apparatus 100 when the drum unit 1 is attached to the image forming apparatus 100.

In the embodiment described above, the coil spring 233 is positioned between the outer surface of the third frame plate 23 and the electrical contact surfaces 90. In the first modification described above, the coil spring 302 is positioned between the casing 3 of the image forming apparatus 100 and the device-side connector 301. However, in the second modification, a coil spring is positioned neither between the outer surface of the third frame plate 23 and the electrical contact surfaces 90, nor between the casing 3 of the image forming apparatus 100 and the device-side connector 301. In the second modification, the casing 3 of the image forming apparatus 100 includes a support part 304 configured to support the electrical contacts 303. The support part 304 is configured of a leaf spring that is elastically deformable. Through deformation of the support part 304, the electrical contacts 303 are movable in the fourth direction. Even with this configuration, the electrical contact surfaces 90 can contract the electrical contacts 303 of the image forming apparatus 100 while reducing contact pressure between the electrical contacts 303 and the electrical contact surfaces 90. This configuration can also reduce the number of components in the drum unit 1 since an elastic member separate from the support part 304 is not required.

Note that the third frame plate 23 supporting the circuit board 235 may be partially formed of an elastically deformable leaf spring instead of, or in addition to, the support part 304 supporting the electrical contacts 303.

<4-3. Third Modification>

Figure 13:
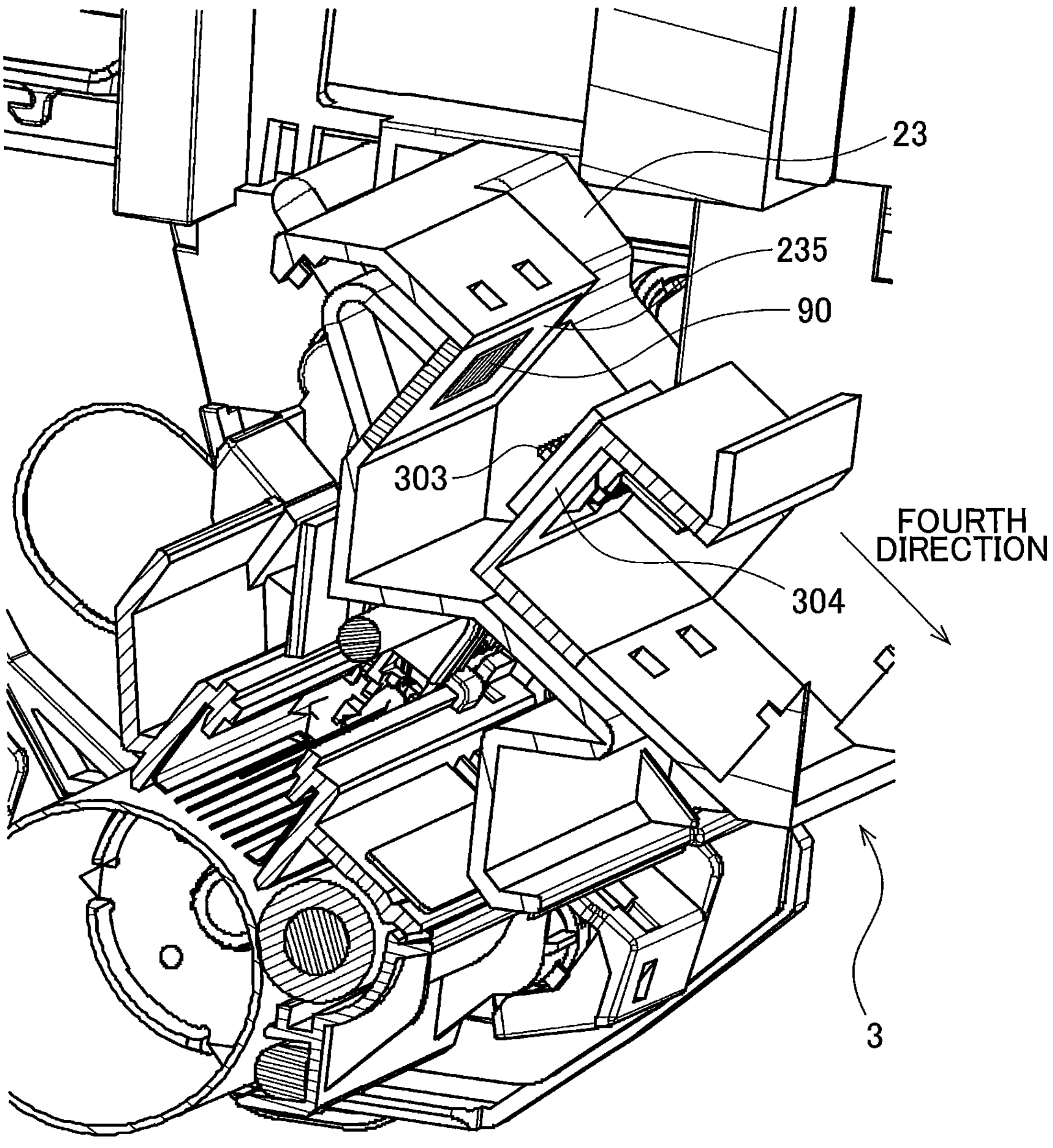
FIG. 13 is a partial perspective view of an image forming apparatus according to a third modification.
Figure 14:
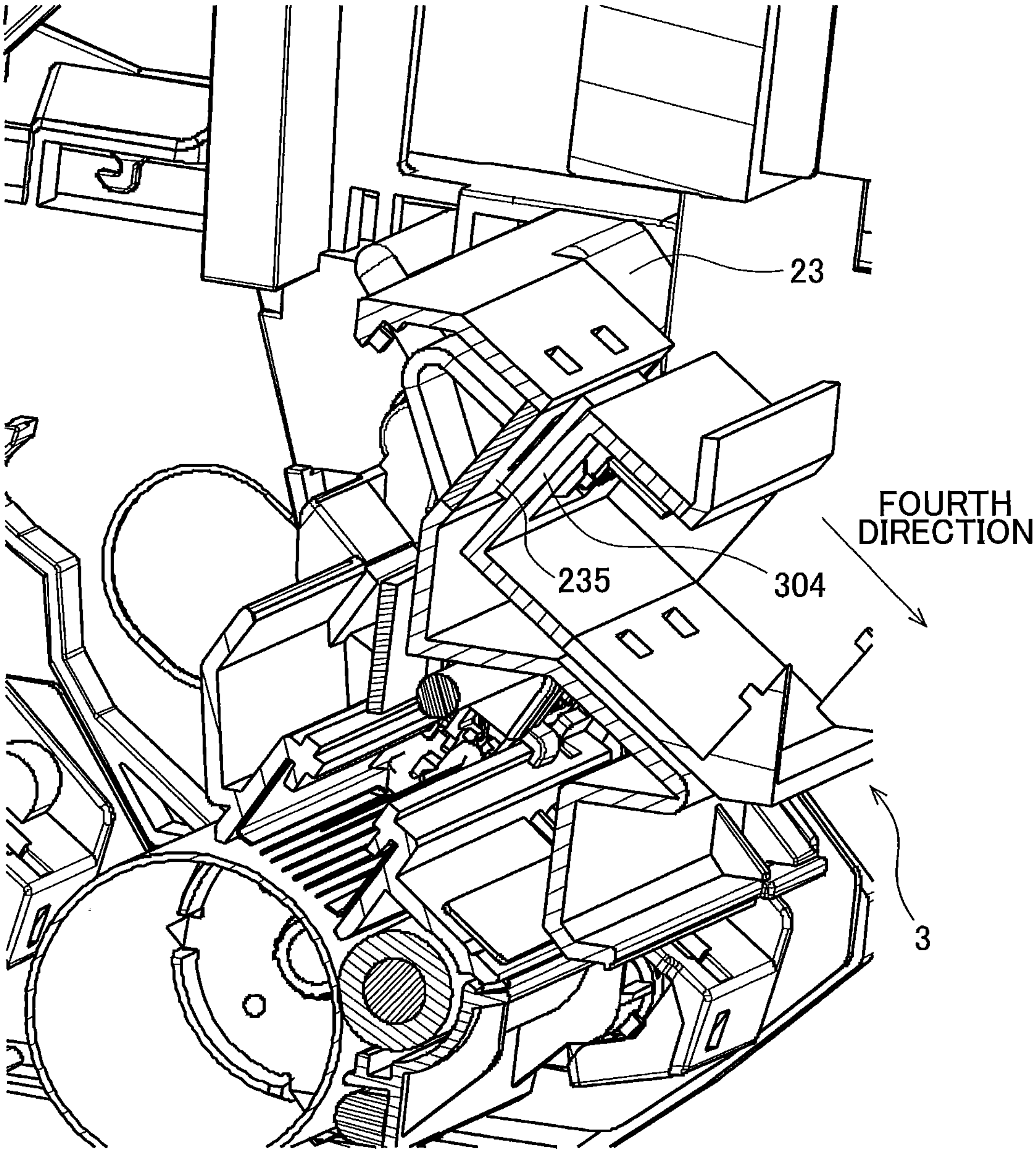
FIG. 14 is another partial perspective view of the image forming apparatus according to the third modification.

FIGS. 13 and 14 are partial perspective views of an image forming apparatus 100 according to a third modification. FIG. 13 illustrates a state in which the electrical contact surfaces 90 are not contacting electrical contacts 303 of the image forming apparatus 100, and FIG. 14 illustrates a state in which the electrical contact surfaces 90 are contacting electrical contacts 303 of the image forming apparatus 100.

In the second modification described above, the support part 304 supporting the electrical contacts 303 is formed of an elastically deformable leaf spring. However, in the third modification, the support part 304 supporting the electrical contacts 303 is a rigid body having low flexibility. In addition, the third frame plate 23 supporting the circuit board 235 in the third modification is also a rigid body having low flexibility. The circuit board 235 includes the electrical contact surface 90. The circuit board 235 is configured to be fixed so as to be incapable of moving relative to the third frame plate 23. The circuit board 235 may be fixed to the third frame plate 23 with adhesive, screws, or another means. This configuration is feasible provided that the contact pressure between the electrical contacts 303 and the electrical contact surfaces 90 is maintained within an allowable range.

<4-4. Fourth Modification>

Figure 15:
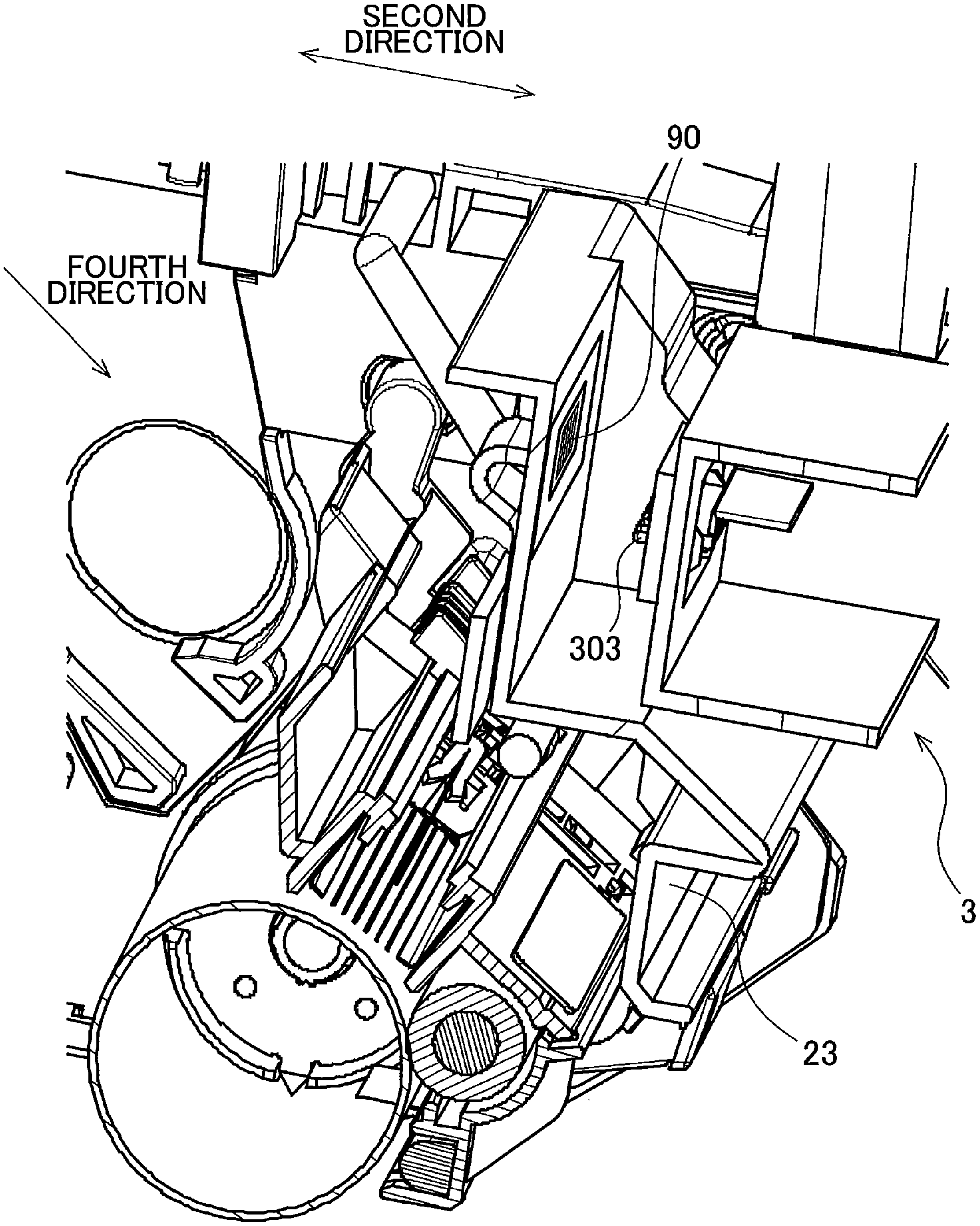
FIG. 15 is a partial perspective view of an image forming apparatus according to a fourth modification.
Figure 16:
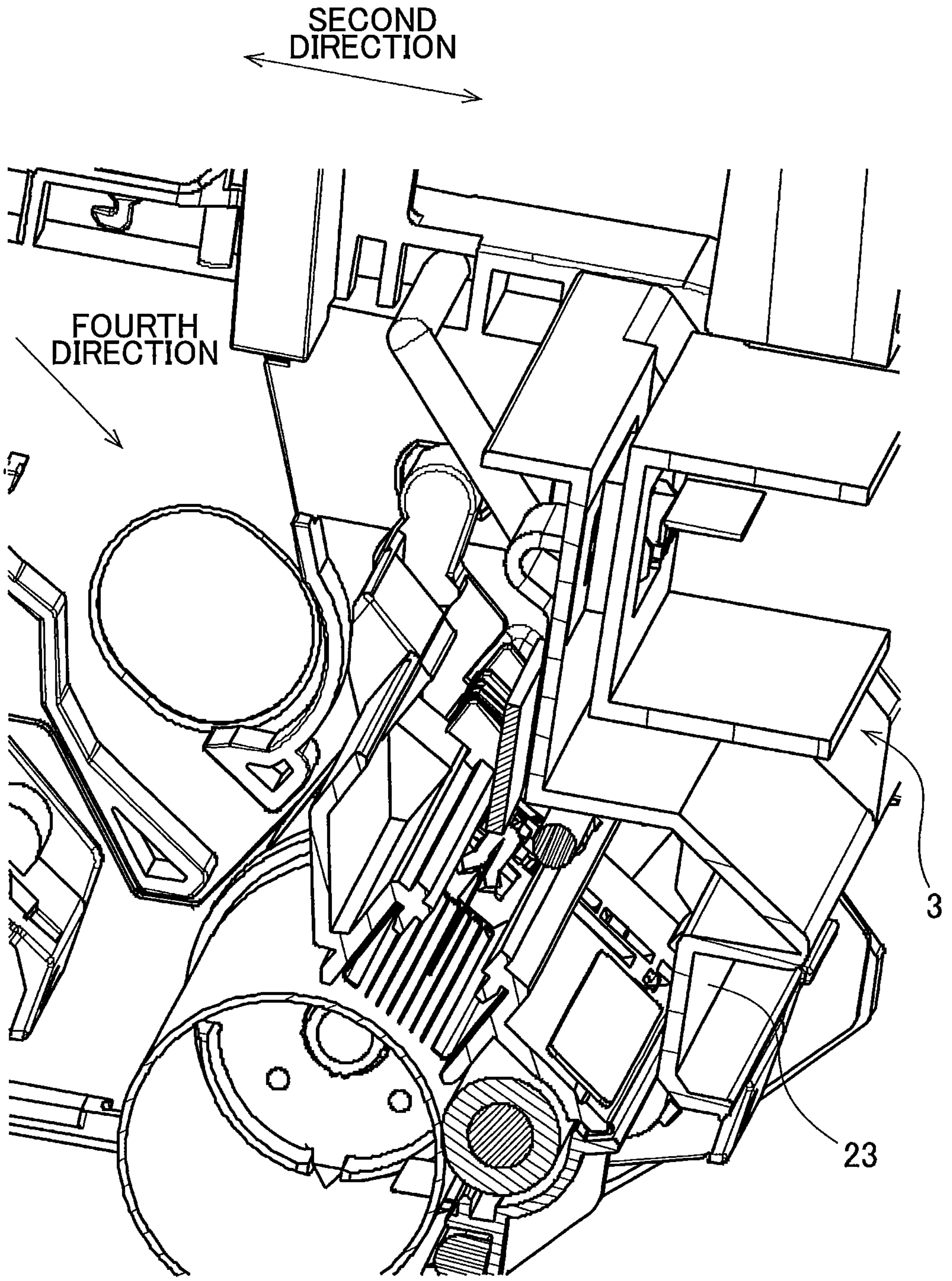
FIG. 16 is another partial perspective view of the image forming apparatus according to the fourth modification.

FIGS. 15 and 16 are partial perspective views of an image forming apparatus 100 according to a fourth modification. FIG. 15 illustrates a state in which the electrical contact surfaces 90 are separated from the electrical contacts 303 in the image forming apparatus 100. FIG. 16 illustrates a state in which the electrical contact surfaces 90 contact the electrical contacts 303 of the image forming apparatus 100.

In the above-described embodiment and the first through third modifications described above, the electrical contact surfaces 90 faces in the fourth direction. However, in the fourth modification, the electrical contact surfaces 90 faces in the second direction. That is, the electrical contact surfaces 90 faces in a direction away from the fourth frame plate 24 in the second direction.

When attaching the drum unit 1 to the image forming apparatus 100, the user first inserts the drum unit 1 into the interior space 6 of the casing 3 in the second direction. Then, the user closes the cover 4. Accordingly, the drum unit 1 is moved in the fourth direction. This movement in the fourth direction includes a component of movement toward the first side of the second direction. Hence, the electrical contact surfaces 90 contact the electrical contacts 303 of the image forming apparatus 100, as illustrated in FIG. 16. With the above configuration, the electrical contact surfaces 90 contact the electrical contacts 303 of the casing 3 of the image forming apparatus 100 when the drum unit 1 is attached to the image forming apparatus 100.

<4-5. Fifth Modification>

Figure 17:
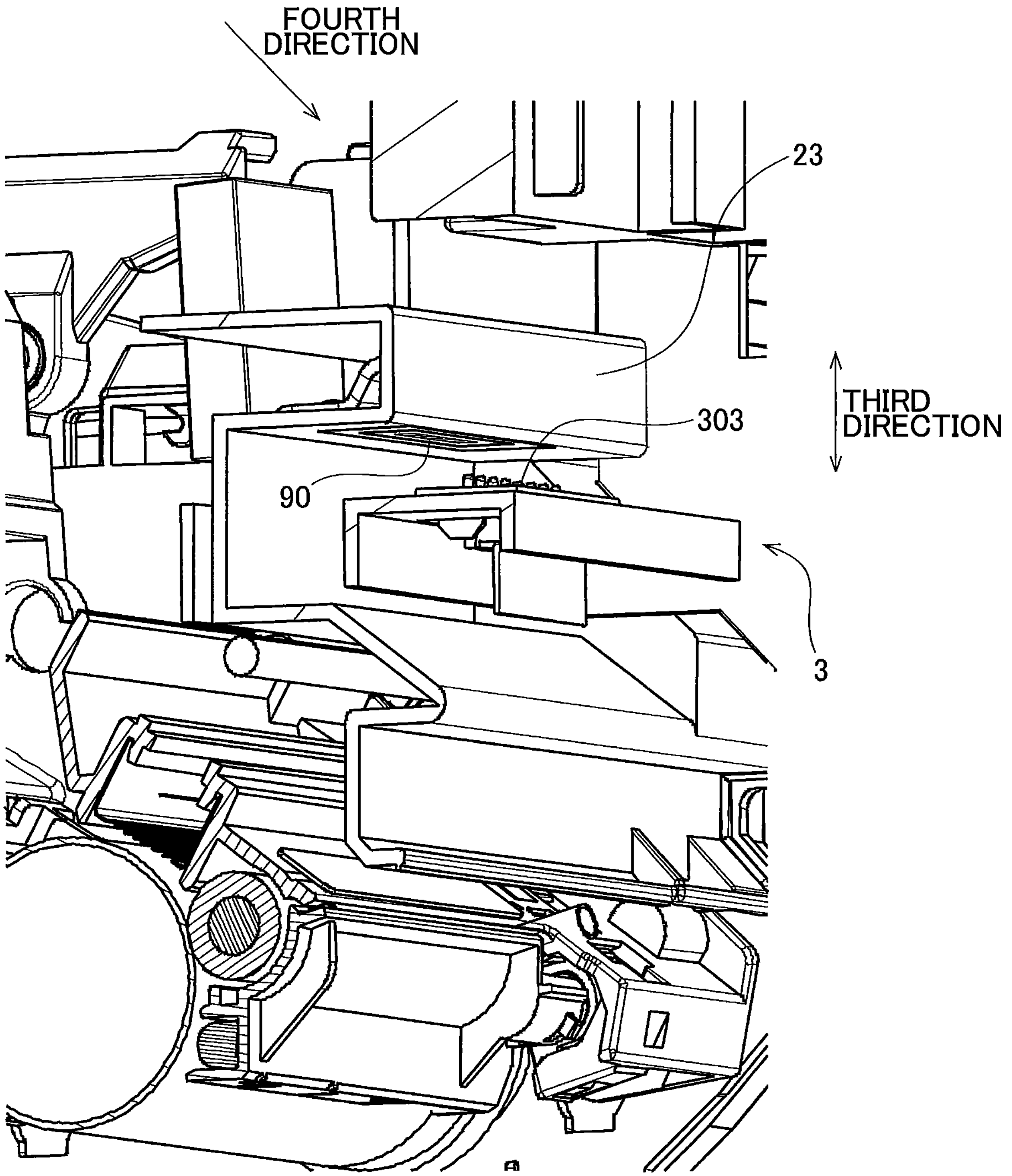
FIG. 17 is a partial perspective view of an image forming apparatus according to a fifth modification.
Figure 18:
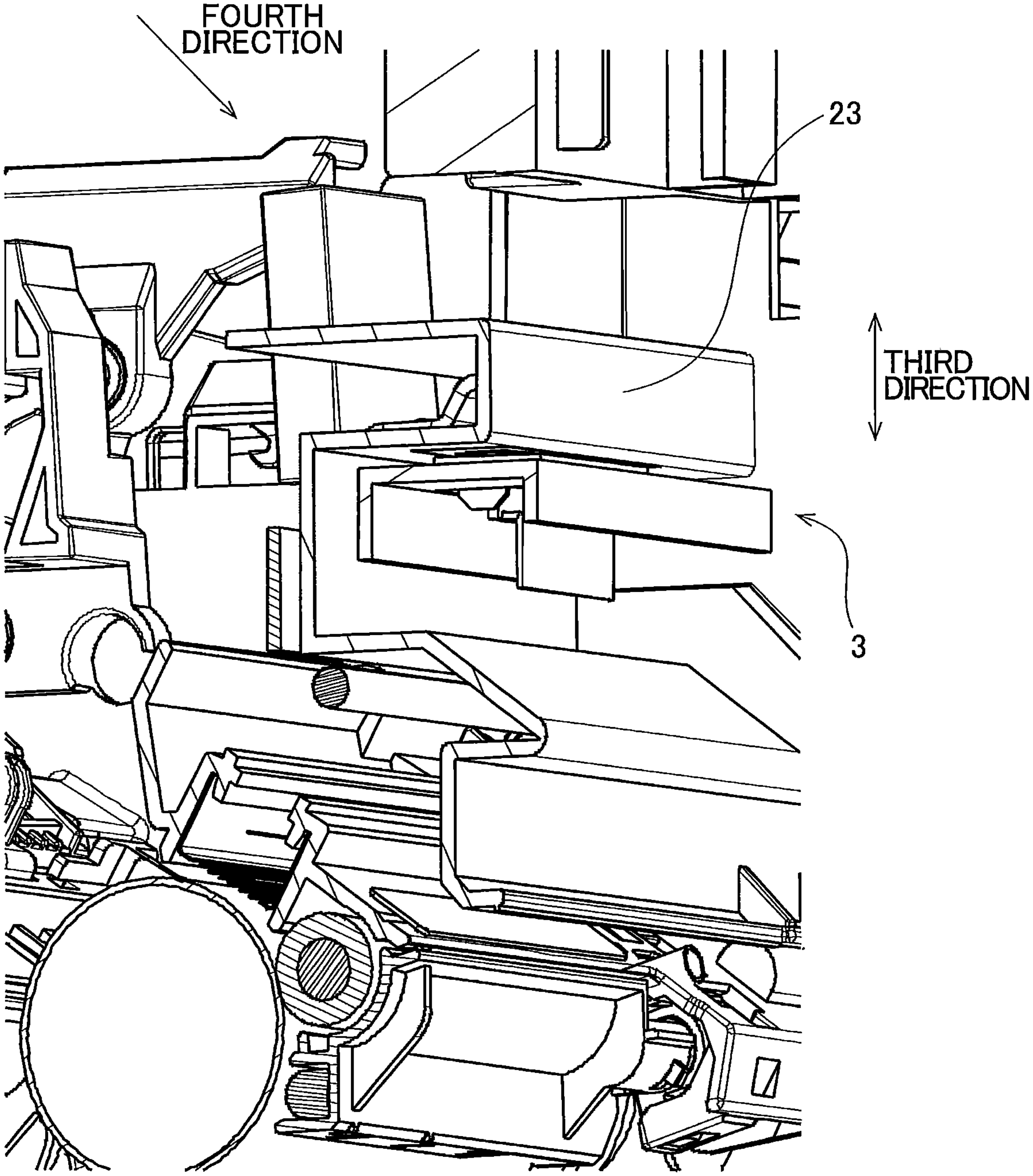
FIG. 18 is another partial perspective view of the image forming apparatus according to the fifth modification.

FIGS. 17 and 18 are partial perspective views of an image forming apparatus 100 according to a fifth modification. FIG. 17 illustrates a state in which the electrical contact surfaces 90 are not contacting electrical contacts 303 in the image forming apparatus 100, while FIG. 18 illustrates a state in which the electrical contact surfaces 90 are contacting electrical contacts 303 of the image forming apparatus 100.

In the above-described embodiment and the first through third modifications described above, the electrical contact surfaces 90 faces in the fourth direction. However, in the fifth modification, the electrical contact surfaces 90 faces in the third direction. In other words, the electrical contact surfaces 90 faces toward the transfer belt 5 in the third direction.

When attaching the drum unit 1 to the image forming apparatus 100, the user first inserts the drum unit 1 into the interior space 6 of the casing 3 in the second direction. Next, the user places the cover 4 into the closed position, whereby the drum unit 1 is moved in the fourth direction. This movement in the fourth direction includes a component of movement toward the first side of the third direction. Hence, the electrical contact surfaces 90 contact the electrical contacts 303 of the image forming apparatus 100, as illustrated in FIG. 18. This configuration enables the electrical contact surfaces 90 to contact the electrical contacts of the casing 3 of the image forming apparatus 100 when the drum unit 1 is attached to the image forming apparatus 100.

<4-6. Sixth Modification>

Figure 19:
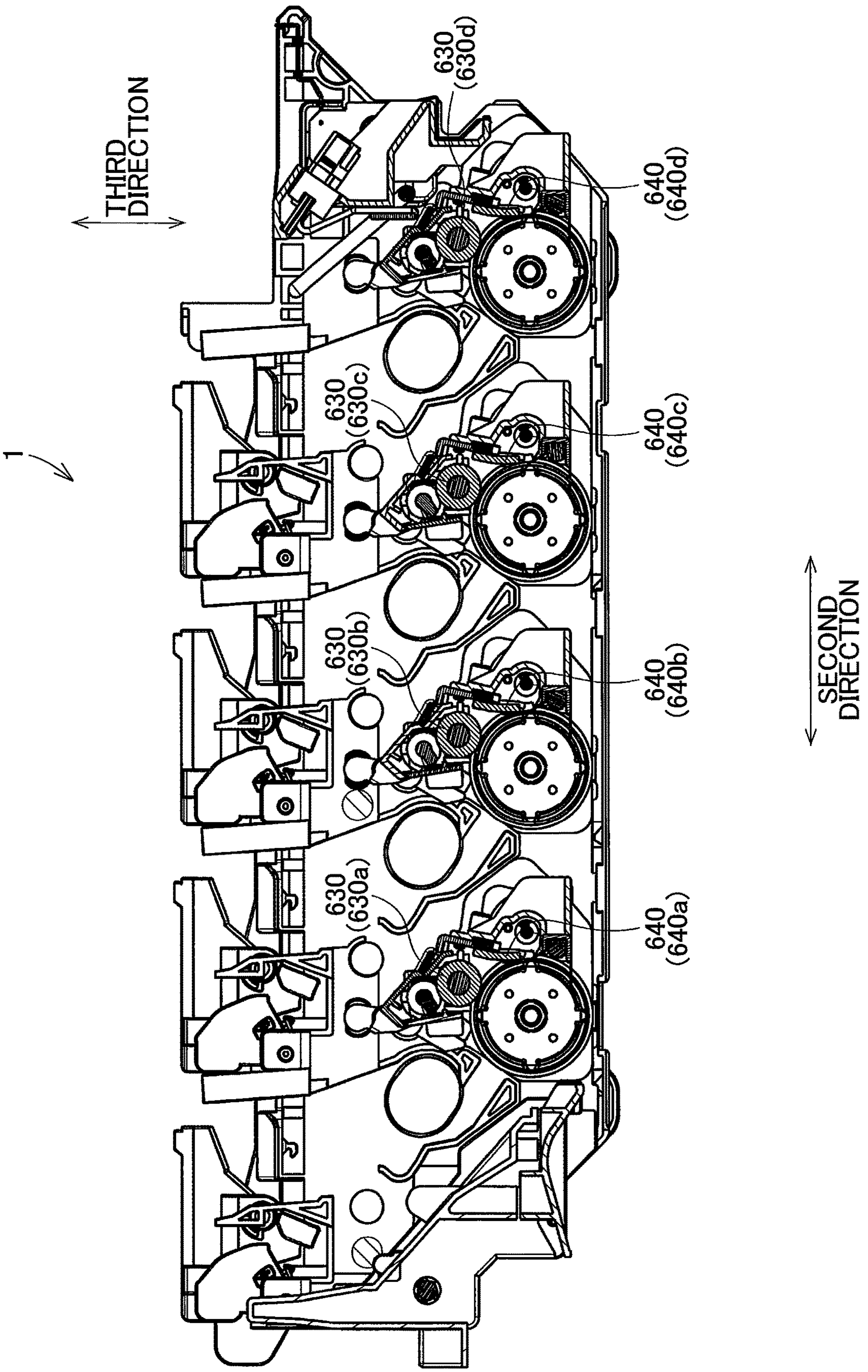
FIG. 19 is a cross-sectional view of a drum unit according to a sixth modification.

FIG. 19 is a cross-sectional view of a drum unit 1 according to a sixth modification. The drum unit 1 according to the above-described embodiment includes the scorotron chargers as the chargers 30. However, as illustrated in the sixth modification in FIG. 19, the drum unit 1 may include charging rollers as chargers 630. More specifically, in the sixth modification, the drum unit 1 includes a first charger 630*a*, a second charger 630*b*, a third charger 630*c*, and a fourth charger 630*d*. Further, the drum unit 1 according to the above-described embodiment includes cleaning rollers as the cleaning members 40. However, as in the sixth modification illustrated in FIG. 19, the drum unit 1 may include cleaning blades as cleaning members 640. More specifically, the drum unit 1 according to the sixth modification includes a first cleaning member 640*a*, a second cleaning member 640*b*, a third cleaning member 640*c*, and a fourth cleaning member 640*d*.

<4-7. Other Modifications>

In the embodiment described above, the four developing cartridges 2 are attachable to the single drum unit 1. However, the number of developing cartridges 2 attachable to the drum unit 1 may be two, three, or five or more.

In the embodiment described above, the IC chip 80 and the electrical contact surfaces 90 constitute the storage medium. However, the storage medium may have a storage unit other than an IC chip.

Detailed shapes of the drum unit and the image forming apparatus may differ from those illustrated in the drawings. Further, the components appearing in the above-described embodiment and the modifications may be suitably combined together avoiding conflicting combination.

What is claimed is:

1. A drum unit insertable into a casing of an image forming apparatus in an insertion direction, the drum unit comprising:

a frame including:
  a first frame plate; and
  a second frame plate spaced apart from the first frame plate in a first direction;
a first photosensitive drum rotatably supported by the first frame plate and the second frame plate about a first axis extending in the first direction;
a second photosensitive drum rotatably supported by the first frame plate and the second frame plate about a second axis extending in the first direction, the second photosensitive drum being spaced apart from the first photosensitive drum in a second direction crossing the first direction; and
a storage medium including:
  a memory storing therein information on the first photosensitive drum and the second photosensitive drum; and
  an electrical contact surface electrically connected to the memory, the electrical contact surface being positioned on a downstream facing surface in the insertion direction.

2. The drum unit according to claim 1, further comprising a wire extending along the first frame plate.

3. The drum unit according to claim 2, further comprising:
an electrical terminal; and
a relay board electrically connected to the electrical terminal via the wire.

4. The drum unit according to claim 3,
wherein the memory is positioned on the relay board.

5. The drum unit according to claim 3,
wherein the frame is configured to hold a cartridge accommodating toner therein.

6. The drum unit according to claim 5, wherein the electrical terminal is configured to be electrically connected to an IC chip of the cartridge in a state where the frame holds the cartridge.

7. The drum unit according to claim 1, further comprising a drum-unit side connector holding the electrical contact surface, the drum-unit side connector including a plurality of protrusions.

8. The drum unit according to claim 7, wherein the drum unit is attachable to the image forming apparatus, and wherein the drum-unit side connector is configured to fit into a device-side connector of the image forming apparatus in a state where the drum unit is attached to the image forming apparatus.

9. The drum unit according to claim 1, wherein the electrical contact surface is movable relative to the frame.

10. The drum unit according to claim 1, wherein a cartridge accommodating toner therein is attachable to the frame.

11. The drum unit according to claim 10, wherein the cartridge includes a developing roller.

12. The drum unit according to claim 1, wherein the electrical contact surface includes:

a first electrical contact surface for inputting information to the memory;

a second electrical contact surface configured to supply electric power to the memory;

a third electrical contact surface for inputting a clock signal to the memory; and a fourth electrical contact surface configured to supply a ground voltage to the memory.

13. The drum unit according to claim 1, further comprising:

a first cleaning blade contacting an outer surface of the first photosensitive drum; and a second cleaning blade contacting an outer surface of the second photosensitive drum.

14. The drum unit according to claim 1, wherein the frame includes a first end and a second end spaced apart from the first end in a third direction perpendicular to the insertion direction, the first photosensitive drum being positioned between the first end and the second end, and wherein the electrical contact surface is electrically connected to the memory, the electrical contact surface being positioned at a leading edge of a downstream side in the insertion direction, the electrical contact surface being positioned between the first end and the second end in the third direction.

15. The drum unit according to claim 1, wherein the electrical contact surface is positioned along a leading edge of a downstream side in the insertion direction.

16. The drum unit according to claim 1, wherein the downstream facing surface is a surface of the frame.

17. The drum unit according to claim 16, wherein the frame further includes a third frame plate positioned at a downstream side in the insertion direction, and wherein the electrical contact surface is positioned on the downstream side of the third frame plate.

18. The drum unit according to claim 1, further comprising a circuit board positioned on the downstream facing surface in the insertion direction, wherein the electrical contact surface is positioned on the circuit board.

19. The drum unit according to claim 18, wherein the circuit board is fixed to the frame such that the circuit board is incapable of moving relative to the frame.

* * * * *